United States Patent
Uga et al.

(10) Patent No.: US 11,728,705 B2
(45) Date of Patent: Aug. 15, 2023

(54) ROTATING ELECTRICAL MACHINE

(71) Applicant: DENSO CORPORATION, Kariya (JP)

(72) Inventors: Toshiaki Uga, Kariya (JP); Yoshihisa Shuji, Kariya (JP); Masahito Fujieda, Nisshin (JP); Hirotaka Kurozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 226 days.

(21) Appl. No.: 17/347,117

(22) Filed: Jun. 14, 2021

(65) Prior Publication Data

US 2021/0391764 A1 Dec. 16, 2021

(30) Foreign Application Priority Data

Jun. 12, 2020 (JP) .................. 2020-102709

(51) Int. Cl.
*H02K 3/28* (2006.01)
*H02K 3/14* (2006.01)
*H02K 3/48* (2006.01)

(52) U.S. Cl.
CPC ............... *H02K 3/28* (2013.01); *H02K 3/14* (2013.01); *H02K 3/48* (2013.01); *H02K 2213/03* (2013.01)

(58) Field of Classification Search
CPC .. H02K 3/12; H02K 3/14; H02K 3/28; H02K 3/48; H02K 2213/03
See application file for complete search history.

(56) References Cited

U.S. PATENT DOCUMENTS 11,296,565 B2 * 4/2022 Herzberger ............. H02K 3/12
2021/0296956 A1 9/2021 Eilenberger

FOREIGN PATENT DOCUMENTS

| JP | S51-140104 A | 12/1976 |
| JP | S59-86445 A | 5/1984 |
| JP | 2014-217136 A | 11/2014 |

* cited by examiner

*Primary Examiner* — Ramon M Barrera
(74) *Attorney, Agent, or Firm* — Oliff PLC

(57) ABSTRACT

A rotating electrical machine is equipped with a stator including a stator winding and a stator core with slots. The stator winding includes phase coils each of which is wound in the slots and connected at an end to a phase terminal and at the other end to a neutral point. The phase coils are each made up of unit coils connected in series between a corresponding one of the phase terminals and the neutral point and connected together using connecting conductors. Each of the phase coils includes two or more reversing connecting conductors each of which orients a direction in which the connecting conductor extends from the $(i+1)^{th}$ unit coil to the $(i+2)^{th}$ unit coil to be opposite to that in which the connecting conductor extends from the $i^{th}$ unit coil to the $(i+1)^{th}$ unit coil. This coil layout ensures a desired degree of electrical insulation in the stator.

11 Claims, 27 Drawing Sheets

ROTATING ELECTRICAL MACHINE

CROSS REFERENCE TO RELATED DOCUMENT

The present application claims the benefit of priority of Japanese Patent Application No. 2020-102709 filed on Jun. 12, 2020, the entire disclosure of which is incorporated herein by reference.

BACKGROUND

1. Technical Field

This disclosure relates generally to a rotating electrical machine.

2. Background Art

Japanese Patent First Publication No. 2014-217136 A discloses a stator winding for use in a rotating electrical machine. The stator winding is equipped with phase coils each of which is made up of a plurality of unit coils wound in the form of a lap winding. The unit coils are joined in series with each other using connecting conductors. Specifically, the unit coils are made by conductor segments each of which extends over a given number m of slots formed in a stator core and are disposed in the slots. The stator core has outer connecting conductors arranged on a radially outer side thereof and inner connecting conductors arranged in a radially inner side thereof. A slot interval of the outer connecting conductors is selected to be an interval corresponding to the (m−1) slots. A slot interval of the inner connecting conductors is selected to be an interval corresponding to the (m+1) slots. Alternatively, the slot interval of the outer connecting conductors is selected to be an interval corresponding to the (m+1) slots. The slot interval of the inner connecting conductors is selected to be an interval corresponding to the (m−1) slots.

Specifically, each of the phase coil of the stator winding includes 2n unit coils connected in series with each other to have a first end and a second end. The first end is connected to a corresponding one of respective phase terminals (i.e., voltage terminals). The second end is connected to a neutral point. The 2n unit coils are broken down into two groups: a first coil group and a second coil group. The first coil group extends from the phase terminal in a clockwise direction to occupy a full circumference of the stator core. The second coil group extends from the first coil group in a counterclockwise direction to occupy the full circumference of the stator core.

In the above structure of the stator winding in which the unit coils are electrically connected in series with each other, the level of voltage developed at each of the unit coils to depend upon a length of an electrical conductor between itself and the phase terminal, thereby causing the levels of the voltages at the unit coils to be different from each other. The closer to the phase terminal, the higher the voltage developed at the unit coils will be. The lap winding usually generates a high potential difference between the unit coils, which may lead to a reduction in electrical insulation between conductors of the unit coils. The ensuring of a desired degree of the electrical insulation requires an increased thickness of insulating layers of the conductors.

SUMMARY

It is, therefore, an object of this disclosure to provide a rotating electrical machine which is capable of controlling a reduction in degree of electrical insulation of a stator.

According to one aspect of the disclosure, there is provided a rotating electrical machine comprising: (a) a stator which includes a stator core and a stator winding, the stator core having formed therein a plurality of slots arranged adjacent each other in a circumferential direction of the stator core, the stator winding being equipped with a plurality of phase coils wound in the slots; and (b) a rotor which is disposed to face the stator and has a plurality of magnetic poles arranged adjacent each other in a circumferential direction of the rotor. The phase coils are connected at first ends thereof to respective phase terminals and at second ends thereof to a neutral point. Each of the phase coils includes a plurality of unit coils which are connected in series with each other in a joining sequence from a corresponding one of the phase terminals. The unit coils are arranged at a given slot pitch away from each other between a corresponding one of the phase terminals and the neutral point. The unit coils are connected together using connecting conductors. The connecting conductors includes a first connecting conductor which connects the $i^{th}$ unit coil to the $(i+1)^{th}$ unit coil, as counted from a corresponding one of the phase terminals in the joining sequence, and a second connecting conductor which connects the $(i+1)^{th}$ unit coil to the $(i+2)^{th}$ unit coil, as counted from a corresponding one of the phase terminals in the joining sequence. Each of the phase coils includes two or more reversing connecting conductors each of which is provided by the second connecting conductor and orients a direction in which the second connecting conductor extends from the $(i+1)^{th}$ unit coil to the $(i+2)^{th}$ unit coil to be opposite to that in which the first connecting conductor extends from the $i^{th}$ unit coil to the $(i+1)^{th}$ unit coil in the circumferential direction of the stator core.

The above rotating electrical machine, as described above, has the stator winding equipped with the phase coils. The unit coils of each of the phase coils are arranged between a corresponding one of the phase terminals and the neutral point and disposed in the slots of the stator core. If the two unit coils of the same phase: one close to the phase terminal, and the other close to the neutral point are disposed in the same slot, it will result in an increased difference between electrical potentials appearing at those unit coils, which may lead to a reduction in electrical insulation therebetween.

In order to alleviate the above problem, the rotating electrical machine in this disclosure is designed to have at least two reversing connecting conductors in each of the phase coils. Each of the reversing connecting conductors is provided by one of the connecting conductors connecting the $(i+1)^{th}$ unit coil to the $(i+2)^{th}$ unit coil and orients a direction in which the one of the connecting conductors extends to be opposite to that in which one of the connecting conductors which extends to connect the $i^{th}$ unit coil to the $(i+1)^{th}$ unit coil in the circumferential direction of the stator core. This cause ones of the unit coils which are located close to each other in terms of the joining sequence from the phase terminal to be disposed in the same slot, thereby minimizing an undesirable rise in potential difference between the unit coils to ensure a desired degree of electrical insulation in the stator.

In the first preferred mode of this disclosure, each of the phase coils may include at least two series-connected coil groups into which the unit coils are broken down. The series-connected coil groups are connected in series with each other. Each of the series-connected coil groups is equipped with the reversing connecting conductor.

Each of the series-connected coil groups is, as described above, equipped with the reversing connecting conductor(s), thereby increasing the number of reversals of orientations of the unit coils, which servers to enhance a reduction in potential difference between the unit coils.

In the second preferred mode, each of the series-connected coil groups may be designed to include four of the unit coils which are connected in series with each other. The connecting conductors includes a first connecting section, a second connecting section, and a third connecting section. The first connecting section connects between a first unit coil that is a first one of the unit coils of each of the series-connected coil groups, as counted from a corresponding one of the phase terminals in the joining sequence, and a second unit coil that is a second one of the unit coils, as counted from a corresponding one of the phase terminals in the joining sequence. The second connecting section connects between the second unit coil and a third unit coil that is a third one of the unit coils, as counted from a corresponding one of the phase terminals in the joining sequence. The third connecting section connects between the third unit coil and a fourth unit coil that is a fourth one of the unit coils, as counted from a corresponding one of the phase terminals in the joining sequence. A direction in which the second connecting section extends from the second unit coil to the third unit coil is opposite to that in which the first connecting section extends from the first unit coil to the second unit coil in the circumferential direction of the stator core. A direction in which the third connecting section extends from the third unit coil to the fourth unit coil is opposite to that in which the second connecting section extends in the circumferential direction of the stator core. The second connecting section and the third connecting section are used as the reversing connecting conductors.

In brief, each of the series-connected coil groups each of which is made up of the four unit coils has the first, second, and third connecting sections which are reversed in orientation thereof to each other. This enables the unit coils which are located close to each other in terms of the joining sequence to be disposed in the same slots, thereby resulting in a decrease in potential difference between the unit coils. The two reversing connecting conductors may be provided for each pole pair in the circumferential direction.

In the third preferred mode, each of the phase coils may include the two or more series-connected coil groups connected in parallel to each other and may occupy a full circumference of the stator core. Each of the series-connected coil groups of each of the phase coils occupies an angular range of the stator core which is smaller than the full circumference of the stator core. The series-connected coil groups are offset from each other in the circumferential direction of the stator core.

Each of the series-connected coil groups of each of the phase coils, as described above, extends in the angular range smaller than the full circumference of the stator core, thereby facilitating the ease with which each of the series-connected coil groups has the reversing connecting conductors which reverse the connecting direction.

In the fourth preferred mode, each of the phase coil may be made up of the m unit coils which are connected in series with each other between a corresponding one of the phase terminals and the neutral point. The two or more reversing connecting conductors are arranged in a range of the full circumference of the stator core.

The m unit coils of each of the phase coils are, as described above, connected in series with each other between the phase terminal and the neutral point. In other words, the unit coils are all connected in series without being connected in parallel to each other. Such a coil layout enables the two or more reversing connecting conductors to be disposed in a range of the full circumference of the stator core, thereby effectively reducing a potential difference between the unit coils in an intermediate range between the phase terminal and the neutral point.

In the fifth preferred mode, the stator core may have formed therein the 2k slots for each pole and each phase where k is a natural number. The unit coils may be made of a conductor wound in the form of a lap winding. The unit coils have coil sides arranged in the slots in the form of multiple layers stacked in a radial direction of the stator core. If one pole pitch is defined as a j-slot pitch, the connecting conductors extend by at least one of a j-slot pitch, a (j−1) slot pitch, and a (j+1)-slot pitch in the circumferential direction of the stator core.

In the above coil layout in which the conductor wound in the form of a lap winding, the conductor is disposed in the form of multiple layers stacked radially in each of the slots. The coil units which are arranged adjacent each other on a radially innermost or a radially outermost side of the stator core may be connected together using the connecting conductors. The unit coils of the same phase are disposed in the 2k slots for each pole. The connecting conductors connect between the slots arranged at a j-slot pitch or a (j±1)-slot pitch away from each other. This layout is useful in reversing the circumferential orientations (i.e., the connecting directions) of the connecting conductors. This structure enables the length of the connecting conductors to be decreased.

In the sixth preferred mode, each of the unit coils may be made of a plurality of conductor segments each of which includes a pair of straight sections and a turn connecting the straight sections together. The straight sections of the conductor segments are joined together in the form of a lap winding. Each of the connecting conductors connects between excess portions of the straight sections of a respective two of the unit coils which are arranged successively adjacent each other in terms of the joining sequence.

Each of the unit coils is, as described above, made up of the plurality of conductor segments. This structure facilitates the ease with which the slot pitches of the unit coil or the connecting conductors are changed by changing a circumferential dimension of the turn connecting the straight sections or a circumferential interval between welds of ends of the straight sections.

In the seventh preferred mode, the connecting conductors may be arranged alternately on a first radial side and a second radial side of the stator core in terms of the joining sequence of the unit coils. If one pole pitch is defined as a j-slot pitch, the connecting conductors on the first radial side of the stator core extend by the j-slot pitch in the circumferential direction of the stator core. The connecting conductors on the second radial side of the stator core extend by a (j±1)-slot pitch in the circumferential direction of the stator core.

In the eighth preferred mode, the connecting conductors may be, like in the seventh preferred mode, arranged alternately on the first radial side and the second radial side of the stator core in terms of the joining sequence of the unit coils. If one pole pitch is defined as a j-slot pitch, the connecting conductors on the first radial side of the stator core may alternatively extend by the j− and (j+1) slot pitches in the circumferential direction of the stator core. The connecting conductors on the second radial side of the stator core may alternatively extend by a (j−1)-slot pitch in the circumferential direction of the stator core.

In the ninth preferred mode, the connecting conductors may be, like in the seventh preferred mode, arranged alternately on the first radial side and the second radial side of the stator core in terms of the joining sequence of the unit coils. If one pole pitch is defined as a j-slot pitch, the connecting conductors on the first radial side of the stator core may alternatively extend by the j- and (j+1) slot pitches in the circumferential direction of the stator core. The connecting conductors on the second radial side of the stator core may alternatively extend by a j- and (j±1)-slot pitch in the circumferential direction of the stator core.

In the tenth preferred mode, the phase coils may be arranged to have a given phase difference between ends leading to the phase terminals. The given phase difference meets a relation of [480°/(the number of pole pairs×the number of arrays of the unit coils connected in parallel to each other)].

In the above structure, ends of the phase coils close to the phase terminals are dispersedly arranged in the circumferential direction of the stator core, thereby reducing a potential difference between the unit coils of the different phases which are arranged adjacent each other.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

First Embodiment

A rotating electrical machine according to an embodiment be described below with reference to the drawings. The rotating electrical machine in this embodiment is designed as an electrical drive motor which outputs drive power or torque to move an electric vehicle.

Figure 1:
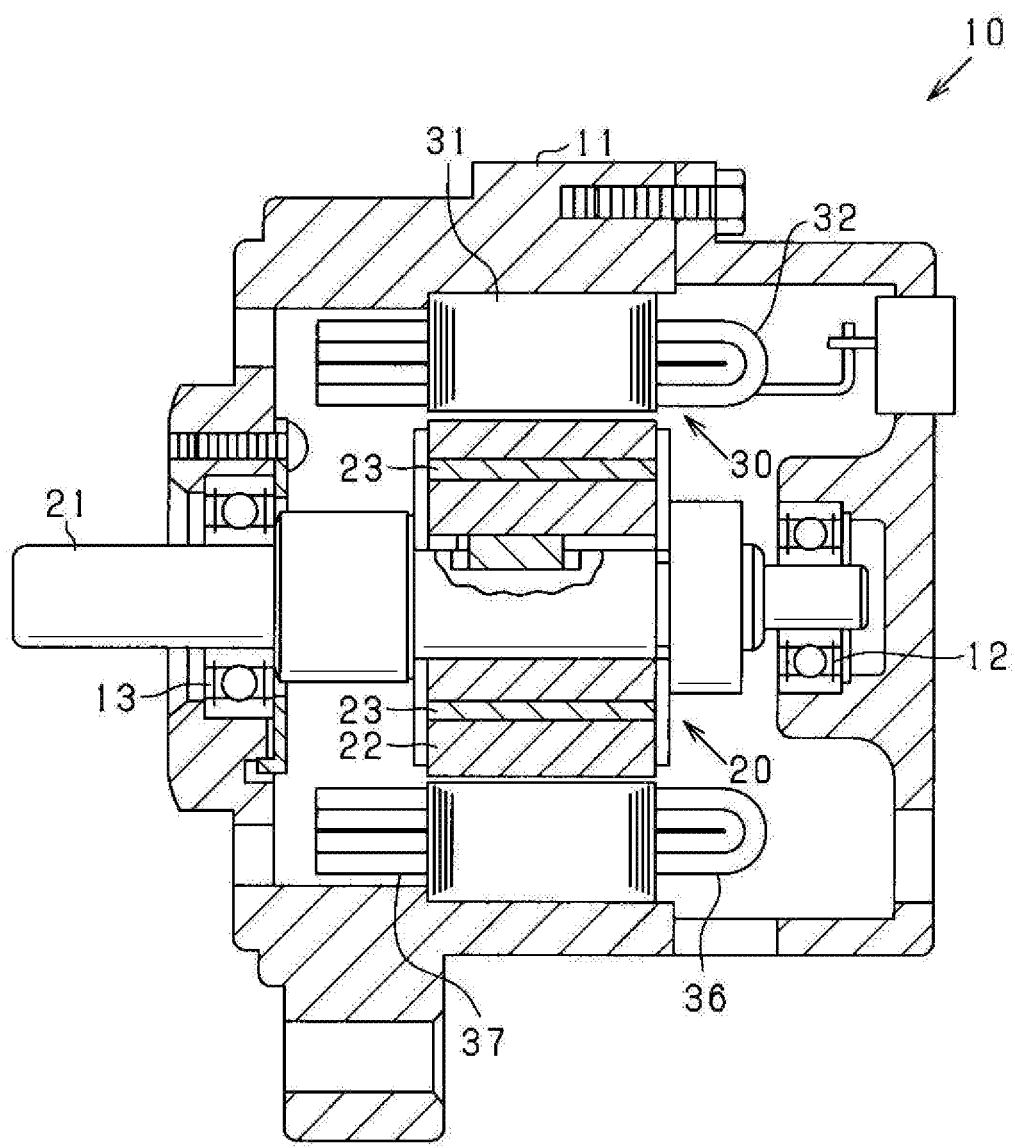
FIG. 1 is a sectional view which illustrates an overall structure of a rotating electrical machine.

First, an overall structure of the rotating electrical machine 10 will be described. FIG. 1 is a sectional view which illustrates the overall structure of the rotating electrical machine 10. In the following discussion, a direction in which the central axis of rotation of the rotating electrical machine 10 is oriented will be referred to as an axial direction. A direction which is oriented perpendicular to the central axis of rotation of the rotating electrical machine 10 will be referred to as a radial direction. A direction circumferentially extending about the central axis of rotation of the rotating electrical machine 10 will be referred to as a circumferential direction. The rotating electrical machine 10 is, as can be seen in FIG. 1, designed as an inner-rotor type three-phase alternating-current rotating electrical machine and includes the housing 11, the rotor 20, and the stator 30.

The rotor 20 includes the rotating shaft 21, the rotor core 22, and a plurality of permanent magnets 23. The rotor core 22 is firmly secured to the rotating shaft 21. The rotating shaft 21 is retained by the housing 11 to be rotatable using the bearings 12 and 13. The permanent magnets 23 are arranged at a given interval away from each other in a circumferential direction of the rotor core 22 and magnetized to have polarities: N-poles and S-poles arrayed alternately in the circumferential direction, so that a plurality of magnetic poles are disposed adjacent each other in the circumferential direction. The rotor 20 may be of another type, such as a field-winding type in which a field winding is wound around a Lundell-pole core.

Figure 2:
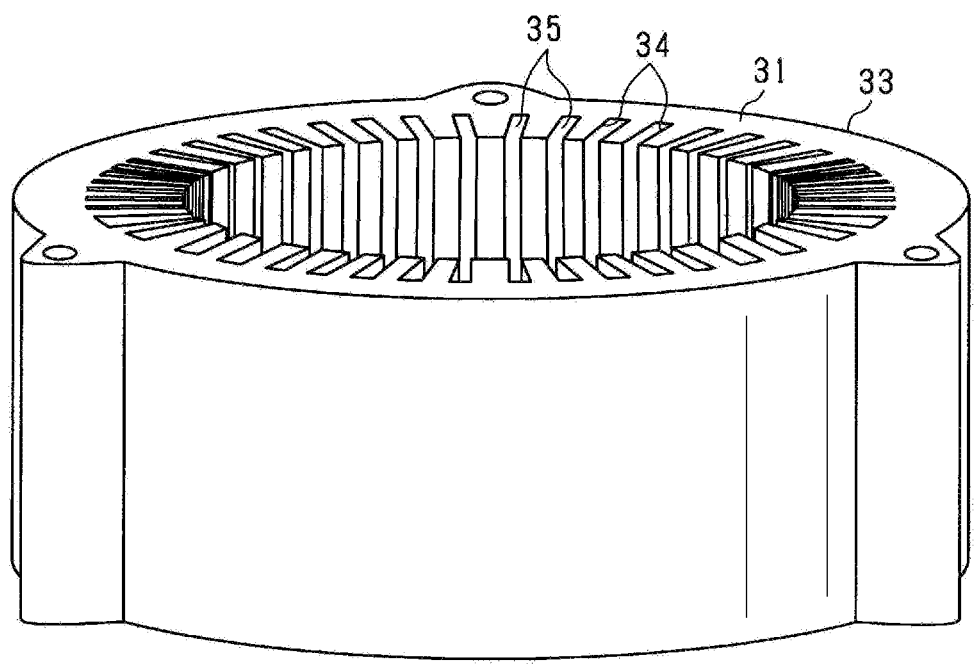
FIG. 2 is a perspective view which illustrates a stator core installed in the rotating electrical machine in FIG. 1.

The stator 30 is disposed outside the rotor 20 in a radial direction thereof. The stator 30 includes the stator core 31 and the stator winding 32. The stator core 31 is of a hollow cylindrical shape and secured to an inner surface of a peripheral wall of the housing 11. The stator core 31 is made of a stack of magnetic steel plates laid to overlap each other in the axial direction. The stator core 31, as illustrated in FIG. 2, includes the annular back yoke 33 and the teeth 34 which extend from the back yoke 33 inward in the radial direction of the stator core 31. The stator core 31 also has the slots 35 each of which is formed between a respective adjacent two of the teeth 34. The rotating electrical machine 10 in this embodiment is designed so that the number of magnetic poles is eight, the number of pole pairs is four, and the number of slots for each pole and each phase is two. In other words, the stator core 31 has formed therein a total of 48 slots 35 arranged adjacent each other in the circumferential direction thereof. To say it in a different way, the stator core 31 has the 2k slots 35 formed therein for each pole and each phase where k is a natural number.

The stator winding 32 is made of a conductor wound through the slots 35 of the stator core 31. The stator core 31 has the coil end 36 of the stator winding 32 extending outside one of opposed axial ends thereof in the axial direction and also has the coil end 37 of the stator winding 32 extending outside the other opposed axial end in the axial direction.

Figure 3A:
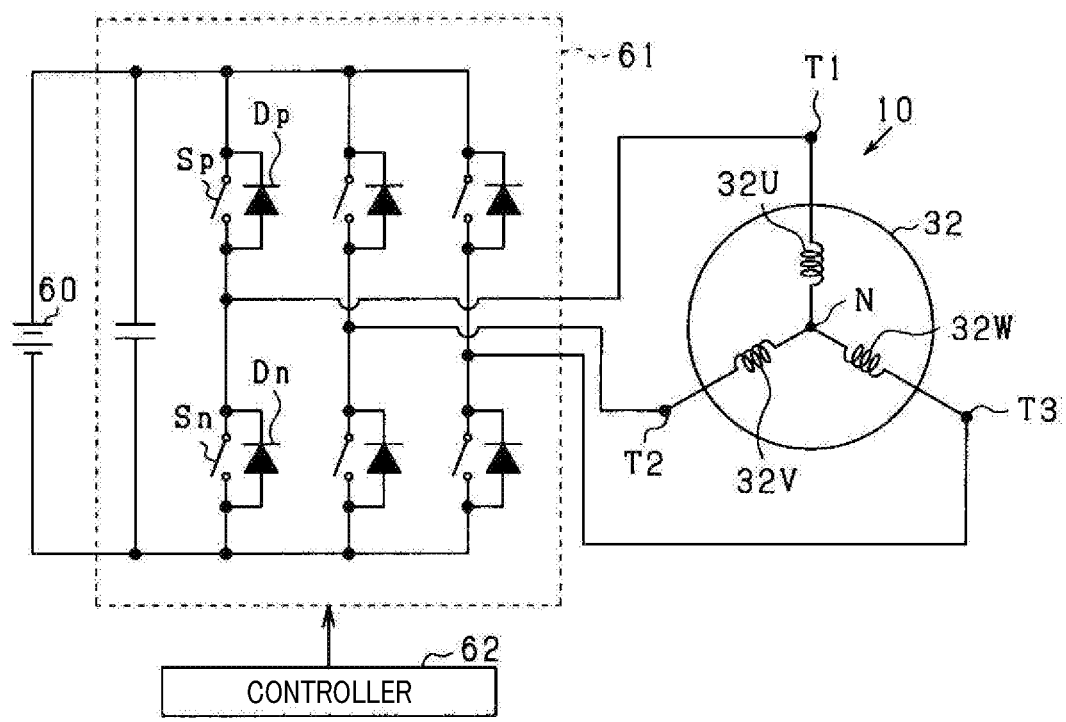
FIG. 3(a) is a circuit diagram which illustrates an electrical circuit of the rotating electrical machine in FIG. 1.

FIG. 3(a) is a circuit diaphragm which illustrates an electrical structure for the stator winding 32. The stator winding 32 includes phase coils: a U-phase coil 32U, a V-phase coil 32V, and a W-phase coil 32W. The U-phase coil 32U, the V-phase coil 32V, and the W-phase coil 32W are joined together at the neutral point N in the form of a star connection (also called a Y-connection).

Figure 3B:
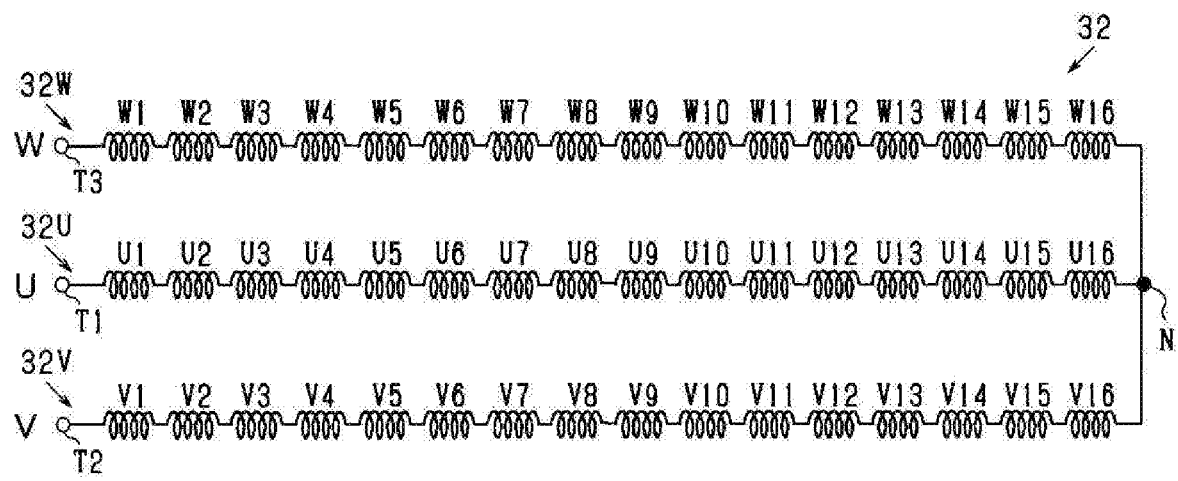
FIG. 3(b) is a developed view which illustrates a stator winding installed in the rotating electrical machine in FIG. 1.

Each of the phase coils 32U, 32V, and 32W is, as can be seen in FIG. 3(b), made of a plurality of unit coils U1 to U16, V1 to V16 or W1 to W16 connected in series with each other. Each of the unit coils is made of a coil conductor disposed in two of the slots 35 which are located at a given slot pitch (also called a coil span or a coil pitch) away from each other in the form of a lap winding. The unit coils are joined together using crossover wires in series with each other. In the structure in FIG. 3(b), each of the phase coils 32U, 32V, and 32W may also be viewed as being including a plurality of series-connected coil groups. The series-connected coil groups are connected in series with each other to complete a corresponding one of the phase coils 32U, 32V, and 32W.

Figure 4:
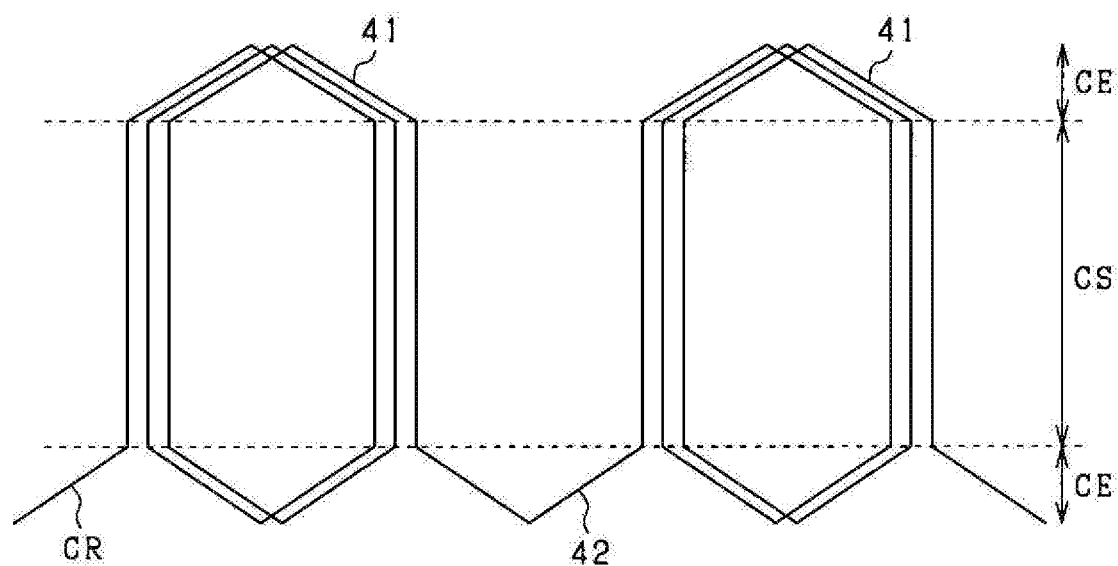
FIG. 4 is a view which illustrates a structure of a unit coil having a lap winding structure.

FIG. 4 illustrates the unit coils 41 having a lap winding structure. Each of the unit coils 41 is made of a conductor CR having a coil side occupying a region indicated by "CS" and coil ends occupying regions indicated by "CE". The coil side extends vertically, i.e., in the axial direction and is disposed inside the slot 35. The coil ends protrude outside the slot 35 in the axial direction. The conductor CR is made of a rectangular conductor having a substantially rectangular transverse cross section. The conductor CR is multiply wound in the form of a lap winding to complete the plurality of unit coils 41. In this embodiment, the unit coils 41 are identical in number of turns with each other. Portions of the unit coils 41 are used as the crossover wires 42 to join the unit coils 41 together. The conductor CR may alternatively be made of a round wire having a circular transverse cross section.

Figure 5:
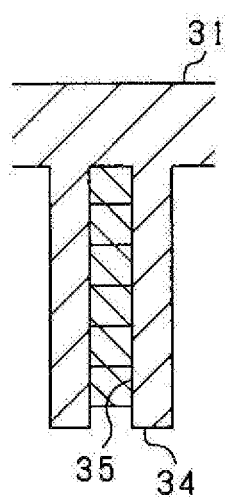
FIG. 5 is a partial view which illustrates conductors disposed in a slot in the form of multiple layers.

The stator core 31, as clearly illustrated in FIG. 5, has the conductor CR disposed in the slots 35 in the form of multiple layers stacked on one another in the radial direction of the stator core 31. The conductor CR is wound in the form of a lap winding to sequentially make turns from a radially outer side or a radially inner side in each of the slots 35, so that the turns of the conductor CR are arranged radially adjacent each other in each of the slots 35.

Figure 6:
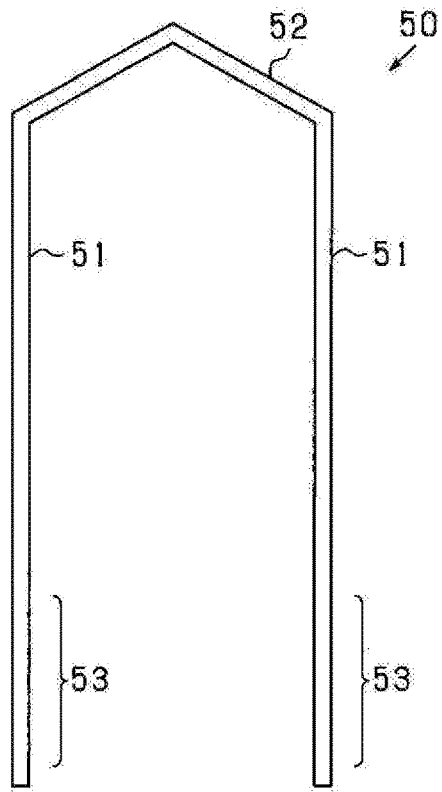
FIG. 6 is a view which illustrates a conductor segment.

The conductor CR may be, as illustrated in FIG. 6, made of conductor segments 50. Each of the conductor segments 50 is formed by a U-shaped rectangular conductor which includes two straight sections 51 and one turn 52 connecting the straight sections 51 together. Each of the straight sections 51 has a length longer than an axial length of the stator core 31 and also has an end farther away from the turn 52 as the excess portion 53. After the conductor segments 50 are inserted into the slots 35, the excess portions 51 of the straight sections 51 protrude outside the slots 35. The excess portions 53 of a respective two of the conductor segments 50 are joined or welded together, thereby joining all the conductor segments 50 together.

Instead of use of the discrete conductor segments 50, the unit coils 41 for each phase coil may alternatively be made of a single continuous conductor.

Referring back to FIG. 3(b), the structure of each of the phase coils 32U, 32V, and 32W will be described below. Each of the phase coils 32U, 32V, and 32W includes the plurality of unit coils 41. For the sake of convenience in the following discussion, the unit coils 41 of the U-phase phase coil 32U, the V-phase coil 32V, and the W-phase coil 32W will be referred to as unit coils U, unit coils V, and unit coils W, respectively.

The U-phase coil 32U is made of the sixteen unit coils U1 to U16 electrically connected to each other in this order. The U-phase coil 32U is connected at an end close to the unit coil U1 with the U-phase terminal T1 and at an end close to the unit coil U16 with the neutral point N.

Similarly, the V-phase coil 32V is made of the sixteen unit coils V1 to V16 electrically connected to each other in this order. The V-phase coil 32V is connected at an end close to the unit coil V1 with the V-phase terminal T2 and at an end close to the unit coil V16 with the neutral point N. The W-phase coil 32W is made of the sixteen unit coils W1 to W16 electrically connected to each other in this order. The W-phase coil 32W is connected at an end close to the unit coil W1 with the W-phase terminal T3 and at an end close to the unit coil W16 with the neutral point N.

The inverter 61 made up of a plurality of switches is, as clearly illustrated in FIG. 3(a), connected between the battery 60 and the phase terminals T1 to T3. Specifically, the inverter 61 is made of a bridge circuit equipped with as many upper and lower arms as the phases of the stator winding 32 and constitutes a three-phase full-wave rectifier. The inverter 61 works as a drive circuit to control the amount of electrical power delivered to the rotating electrical machine 10 to drive or run the rotating electrical machine 10. Specifically, the inverter 61 is equipped with switches Sp and Sn for each phase. The switches Sp and Sn are connected in series with each other and also connected at a joint therebetween to a corresponding one of the phase terminals T1 to T3 of the phase coils 32U, 32V, and 32W. the inverter 61 works in a switching operation mode to regulate the amount of exciting current flowing through the rotating electrical machine 10.

The inverter 61 is equipped with the upper arm switch Sp and the lower arm switch Sn for each of the U-, V- and W-phases. Each of the switches Sn and Sp is implemented by a voltage-controlled semiconductor switch, i.e., an N-channel MOSFET. The upper arm switch Sp has an upper arm diode Dp connected in inverse parallel thereto. Similarly, the lower arm switch Sn has a lower arm diode Dn connected in inverse parallel thereto. The diodes Dp and Dn are implemented in this embodiment by body diodes (i.e., parasitic diodes) of the switches Sp and Sn, respectively, but however, may alternatively be realized using diodes discrete from the switches Sp and Sn.

When the vehicle is being driven, the controller 62 outputs on-off signals to the switches Sp and Sn to deliver a three-phase ac voltage from the battery 60 to the stator winding 32 through the inverter 61, thereby rotating the rotor 20. The rotating shaft 21 of the rotor 20 is joined to a crankshaft of an engine (not shown) of the vehicle directly or through a clutch and/or gears. In the case of the direct joint, the rotating shaft 21 rotates to start the engine.

The rotating electrical machine 10 may be engineered to have a structure discussed below.

The inner-rotor type rotating electrical machine 10 has an outer diameter ratio that is derived by dividing an outer diameter of the stator 30 (i.e., a diameter of an outer periphery of the stator 30) by an outer diameter of the rotor 20 (i.e., a diameter of an outer periphery of the rotor 20) and lies in a range of 1.2 to 1.7.

A stack thickness-to-outer diameter ratio that is derived by dividing the thickness of the stator core 31 (i.e., a dimension of the stator core 31 in the axial direction thereof) by the outer diameter of the rotor 20 (i.e., the diameter of the outer periphery of the rotor 20) is selected to be larger than to 0.6 or more. In this case, the rotating electrical machine 10 is not of a flat type, but a long axis type suitable for high voltage.

A coil end height-to-stack thickness ratio which is derived by dividing the height of the coil end from one of the ends of the stator 30 by the thickness of the stator core 31 (i.e., a dimension of the stator core 31 in the axial direction thereof) is selected to be 0.25 or less. In the above described segment-made stator winding 32, the height of the coil ends may be decreased, thereby increasing the power density of the rotating electrical machine 10.

The winding structure of the stator 30 which has unique features will be described below in detail.

Figure 7:
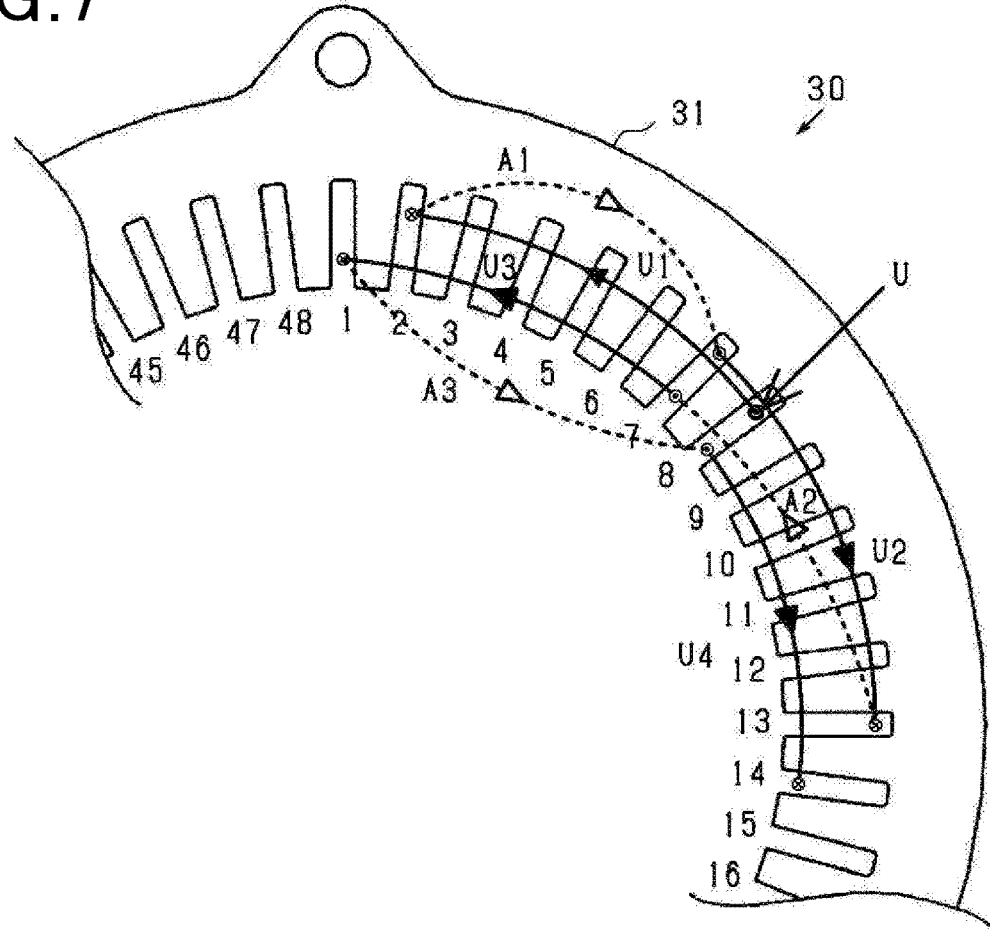
FIG. 7 is a partial view which illustrates a sequence in which unit coils are joined together in a stator core.
Figure 8:
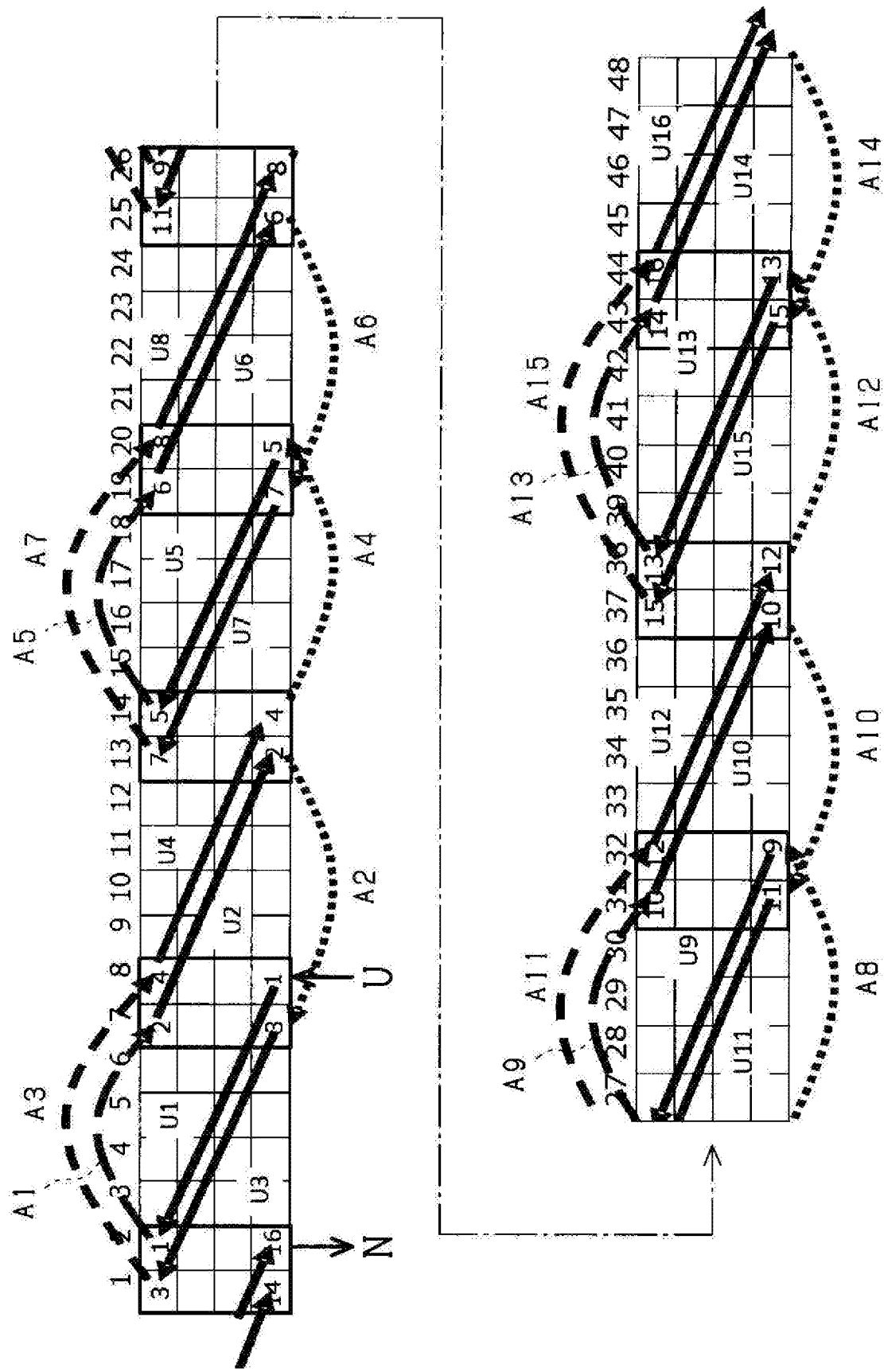
FIG. 8 is a developed plan view which shows a sequence in which unit coils are joined together.

FIG. 7 is a plan view which illustrates the order or sequence (which will also be referred to as a joining sequence) of steps in which the unit coils of the stator core 31 are joined to each other from, for example, the U-phase terminal T1. FIG. 8 is a developed plan view which illustrates the sequence of steps in which the unit coils are joined to each other. For the sake of convenience, each of the FIGS. 7 and 8 shows only the U-phase coil 32U. In FIGS. 7 and 8, the slots 35 are numbered by 1 to 48, which will also be referred to below as the #1 slot to the #48 slot. FIG. 8 demonstrate the unit coils U1 to U16 disposed in the #1 to #48 slots. FIG. 7 demonstrates only the unit coils U1 to U4 for the sake of simplicity. The rightward direction in FIG. 8 corresponds to the clockwise direction in FIG. 7.

In FIGS. 7 and 8, the sequence in which the unit coils U1 to U16 are joined from a starting point that is the U-phase terminal T1 is indicated by arrows. The solid arrows represent the unit coils U1 to U16. The broken arrows represent crossover or connecting sections of the unit coils U1 to U16. The connecting sections (which will also be referred to below as connecting conductors) each connecting two of the unit coils U1 to U16 which are arranged adjacent each other in the joining sequence are indicated by symbols "A1" to "A15". For instance, the connecting section A1 connects the unit coils U1 and U2 together. The connecting section A2 connects the unit coils U2 and U3 together. The connecting section A3 connects the unit coils U3 and U4 together. The same is true for the following connecting sections.

Referring only to the unit coils U1 to U4 of the U-phase coil 32U in FIGS. 7 and 8 for the sake of convenience, the unit coil U1 is disposed in the #2 and #8 slots. The unit coil U2 is disposed in the #7 and #13 slots. The unit coil U3 is disposed in the #1 and #7 slots. The unit coil U4 is disposed in the #8 and #14 slots. Pairs of the #1 and #2 slots, the #7 and #8 slots, and the #13 and #14 slots are used for the same phase and the same magnetic pole. In such pairs, only unit coils of the same phase, e.g., the unit coils U1 to U8 of the U-phase are disposed in the illustrated example. The connecting section A1 connects between the #2 and #7 slots. The connecting section A2 connects between the #7 and #13 slots. The connecting section A3 connects between the #1 and #8 slots. Between the unit coil U4 and the following unit coil U5, the connecting section A4 connects between the #14 and #20 slots.

Each of the unit coils U1 to U4 extends by a 6-slot pitch, in other words, has coil sides (i.e., the straight sections 51) arranged at a 6-slot pitch away from each other. At least two of the connecting sections A1 to A3 connecting the unit coils U1 to U4 together are different in slot pitch from each other. Specifically, in this embodiment, the connecting section A1 connects between two of the slots 35 (i.e., two coil sides) which are located at a 5-slot pitch away from each other. The connecting section A2 connects between two of the slots 35 which are located at a 6-slot pitch away from each other. The connecting section A3 connects two of the slots 35 which are located at a 7-slot pitch away from each other.

In this embodiment, a pole pitch is equal to a 6-slot pitch. If the number of the slots 35 corresponding to the pole pitch is defined as "j", each of the unit coils U1 to U4 has coil sides arranged at a j-slot pitch away from each other. The connecting section A1 connects between the slots 35 arranged at a (j−1)-slot pitch away from each other. The connecting section A2 connects between the slots 35 arranged at a j-slot pitch away from each other. The connecting section A3 connects between the slots 35 arranged at a (j+1)-slot pitch away from each other. The connecting section A4 extending from the unit coil U4 connects between the slots 35 arranged at a j-slot pitch away from each other.

In terms of the joining sequence from the U-phase terminal T1, orientations or directions (which will also be referred to below as connecting directions) in which the connecting sections A1 to A3 of the unit coils U1 to U4 circumferentially extend are not the same. Specifically, the connecting sections A1 and A3 extend in the clockwise direction (i.e., the rightward direction in FIG. 8). The connecting section A2 extends in the counterclockwise direction (i.e., the leftward direction in FIG. 8). The unit coils U1 to U4 are, therefore, turned or folded several times, in other words, the direction in which the unit coils U1 to U4 extend is reversed several times until they extend over the circumference of the stator core 31.

Specifically, the direction in which the connecting section A2 extends from the unit coil U2 to the unit coil U3 is opposite to that in which the connecting section A1 extends from the unit coil U1 to the unit coil U2. The connecting section A2 will also be referred to below as a reversing connecting section. The direction in which the connecting section A3 extends from the unit coil U3 to the unit coil U4 is opposite to that in which the connecting section A2 extends from the unit coil U2 to the unit coil U3. The connecting section A3 will also be referred to below as a reversing connecting section.

Although not described in detail, the unit coils U5 to U8, the unit coils U9 to U12, and the unit coils U13 to U16 which extend from or follow the unit coils U1 to U4 have the same arrangements as those of the unit coils U1 to U4. In brief, the U-phase coil 32U includes four series-connected coil groups (which will also be referred to below as arrays) each of which is made up of a respective four of the unit coils U1 to U16. The four series-connected coil groups are connected in series with each other to complete the U-phase coil 32U. Each of the series-connected coil groups includes the two reversing connecting sections. In the following discussion, the reversing connecting sections will also be referred to as reversing connecting conductors.

Figure 9:
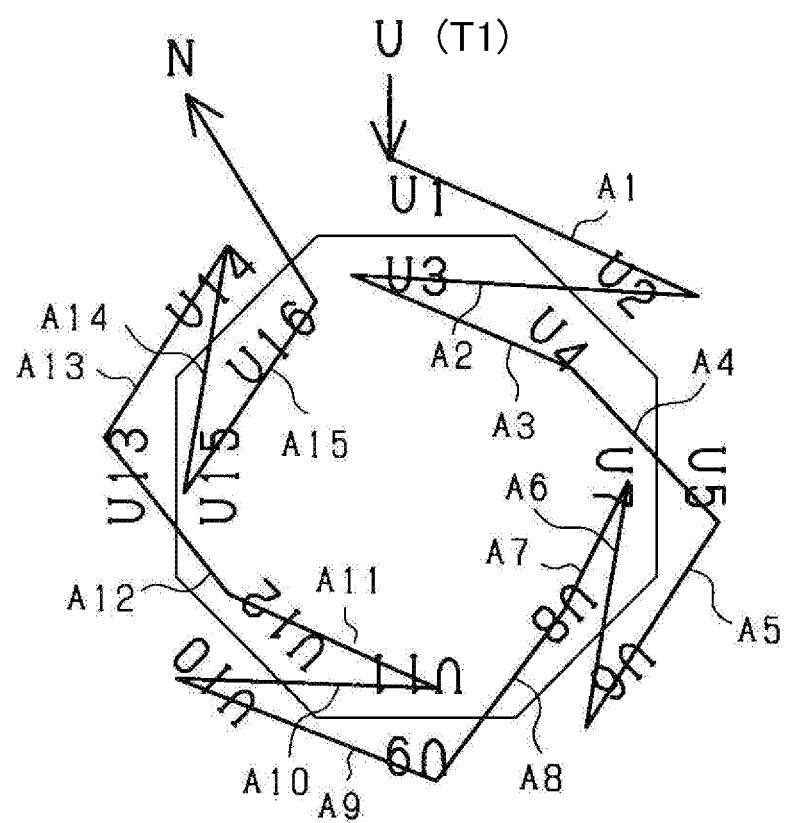
FIG. 9 is a view which illustrates circumferential locations of unit coils and orientations of connecting conductors connecting the unit coils together.

FIG. 9 is a view which illustrates circumferential locations of the unit coils U1 to U16 of the U-phase coil 32U and the connecting directions of the connecting sections A1 to A15 of the U-phase coil 32U. The connecting sections A2, A6, A10, and A14 of the U-phase coil 32U are, as can be seen in the drawing, oriented in the counterclockwise direction between the U-phase terminal T1 and the neutral point N. The connecting directions of the connecting sections A2, A6, A10, and A14 are opposite those of the other connecting sections. Ones of the unit coils U1 to U16 which are located relatively close to each other are, therefore, disposed in the same slot 35, thereby reducing a potential difference between the unit coils U1 to U16.

The segment structure of the stator winding 32 will be described below. Each of the conductor segments 50 has the two straight sections 51 which are arranged at a 6-slot pitch away from each other and connected together by the turn 52. As many conductor segments 50 as the turns 52 of each of the unit coils U1 to U16 are disposed in the same slot 35. The conductor segments 50 are wound in the form of a lap winding for each of the unit coils U1 to U16. The excess portions 53 of the conductor segments 50 of a respective two of the unit coils U1 to U16 which are arranged adjacent each other in the joining sequence are joined or welded together to make a corresponding one of the connecting sections A1 to A15.

A vertical direction, as viewed in FIG. 8, corresponds to the radial direction of the stator core 31. A downward direction corresponds to a radially inward direction. An upward direction corresponds to a radially outward direction. On the radially innermost side of the stator core 31, each of the connecting sections A2, A4, A6, A8, A10, A12, and A14 connects between the slots 35 arranged at a 6-slot pitch away from each other. On the radially outermost side of the stator core 31, each of the connecting sections A1, A3, A5, A7, A9, A11, A13, and A15 connects between the slots 35 arranged at a 7-slot pitch away from each other. If the pole pitch is generally defined as j (=a 6-slot pitch), each of the connecting sections A2, A4, A6, A8, A10, A12, and A14 on the radially innermost side of the stator core 31 connects between the slots 35 arranged at the j-slot pitch away from each other. Each of the connecting sections A1, A3, A5, A7, A9, A11, A13, and A15 connects between the slots 35 arranged at the (j±1)-slot pitch away from each other.

The above slot pitches of the connecting sections A1 to A15 may alternatively be reversed between the radially outer side and the radially inner side of the stator core 31. Specifically, each of the connecting sections A2, A4, A6, A8, A10, A12, and A14 on the radially innermost side of the stator core 31 may connect between the slots 35 arranged at the (j±1)-slot pitch away from each other. Each of the connecting sections A1, A3, A5, A7, A9, A11, A13, and A15 on the radially outermost side of the stator core 31 may connect between the slots 35 arranged at the j-slot pitch away from each other. Some of the turns 52 of the conductor segments 50 may alternatively be used as the connecting sections instead of ones of all of the connecting sections A1 to A15. The use of the turns 52 as the connecting sections may be achieved by designing some of the conductor segments 50 to have intervals between the straight sections (i.e., coil sides) 51 which are different from that of the other conductor segments 50 and identical with required slot-pitches.

The reduction in potential difference between the unit coils U1 to U16 achieved by the winding structure of this embodiment will be described below.

Figure 10:
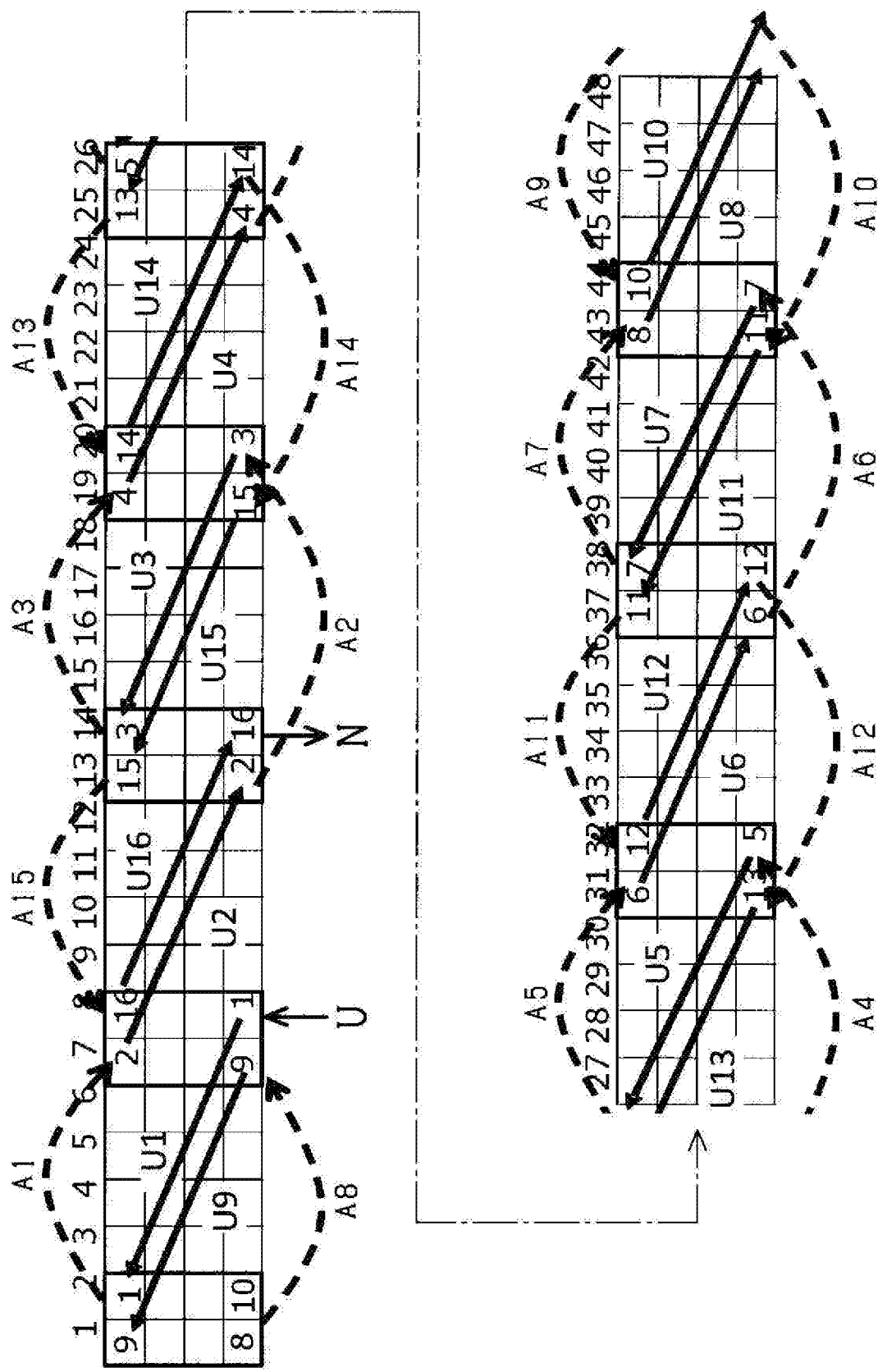
FIG. 10 is a developed plan view which shows a sequence in which unit coils are joined together in a conventional stator.
Figure 11:
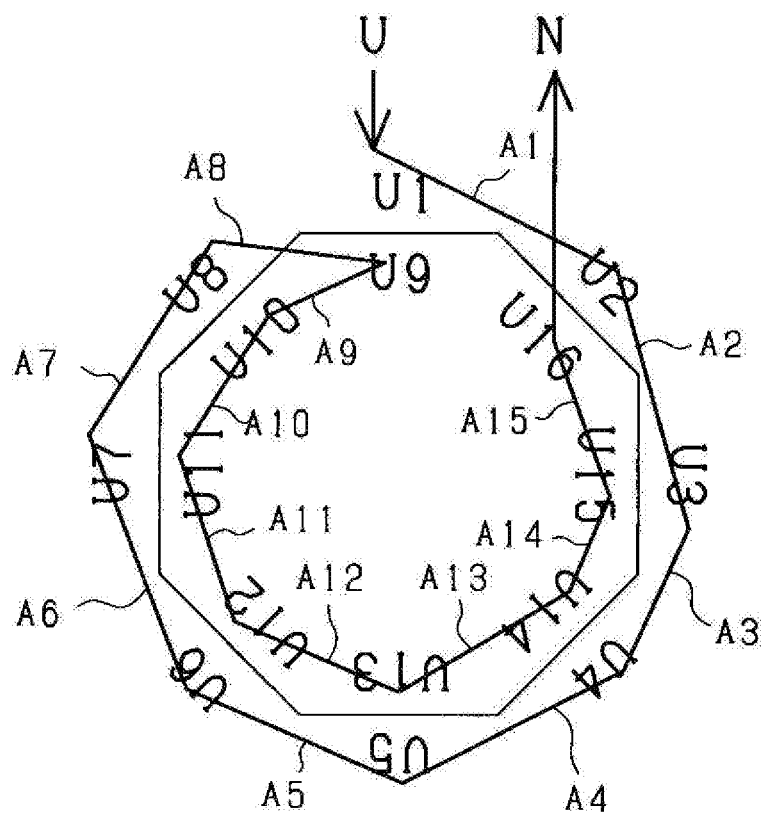
FIG. 11 is a view which illustrates circumferential locations of unit coils and orientations of connecting conductors connecting the unit coils together in a conventional stator.

In the following discussion, a comparative example of a conventional stator winding (e.g., the U-phase coil 32U) will be referred to in which the sixteen unit coils U1 to U16 are, like in FIG. 8, connected in series with each other to have a winding structure illustrated in FIG. 10. FIG. 11 shows circumferential locations of the unit coils U1 to U16 and the connecting directions of connecting sections in the conventional stator winding. The connecting sections A1 to A8 of the unit coils U1 to U9 are, as can be seen in FIG. 11, oriented in the clockwise direction between the U-phase terminal T1 and the neutral point N. The connecting sections A9 to A15 of the unit coils U9 to U16 are oriented in the counterclockwise direction between the U-phase terminal T1 and the neutral point N.

Figure 12:
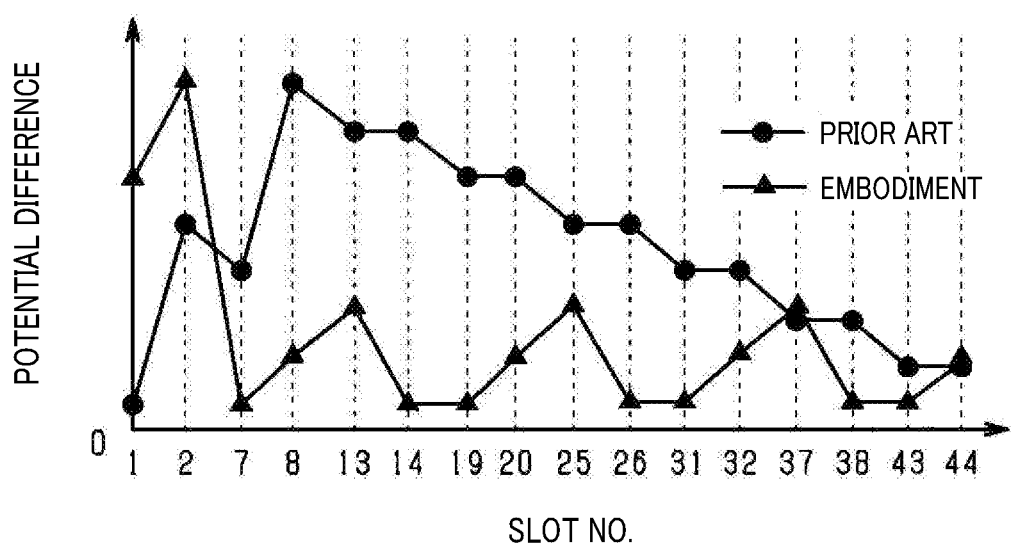
FIG. 12 is a graph which represents numbers of slots in which unit coils are disposed and potential differences between the unit coils.

FIG. 12 is a graph which represents numbers of slots in which the unit coils U1 to U16 of the U-phase coil 32U of each of the stator winding 32 in this embodiment and the above conventional stator winding are disposed and a potential difference between two of the unit coils U1 to U16 which are disposed in each of the slots. The numbers of the unit coils U1 to U16 disposed in the slots in this embodiment are the same as in FIG. 8. The numbers of the unit coils U1 to U6 disposed in the slots in the conventional stator wining are the same as in FIG. 10.

In the conventional stator winding, the unit coils U1 to U16 are folded, in other words, reversed in direction thereof only one time at an intermediate point between the unit coils U1 to U16, that is, between the U-phase terminal T1 and the neutral point N. Accordingly, each of ones of the unit coils U1 to U16, which are arranged closer to the U-phase terminal T1 than the intermediate point is, is paired with a respective one of the others of the unit coils U1 to U16 which are arranged closer to the neutral point than the intermedia point is and disposed in the same slot on a pair basis, thereby resulting in an increased potential difference between the unit coils U1 to U16.

In the stator winding 32 in this embodiment, the unit coils U1 to U4 have the two reversing connecting sections. In other words, the unit coils U1 to U4 are reversed in direction thereof two times. A total of eight reversing connecting sections are, therefore, disposed between the U-phase terminal T1 and the neutral point N. This results in a decreased potential difference between ones of the unit coils U1 to U16 which are disposed in the same slot.

Although not illustrated, the V-phase coil 32V and the W-phase coil 32W have the same structure as that of the U-phase coil 32U. Only one or two of the phase coils 32U, 32V, and 32W may be designed to have the above structure.

Figure 13:
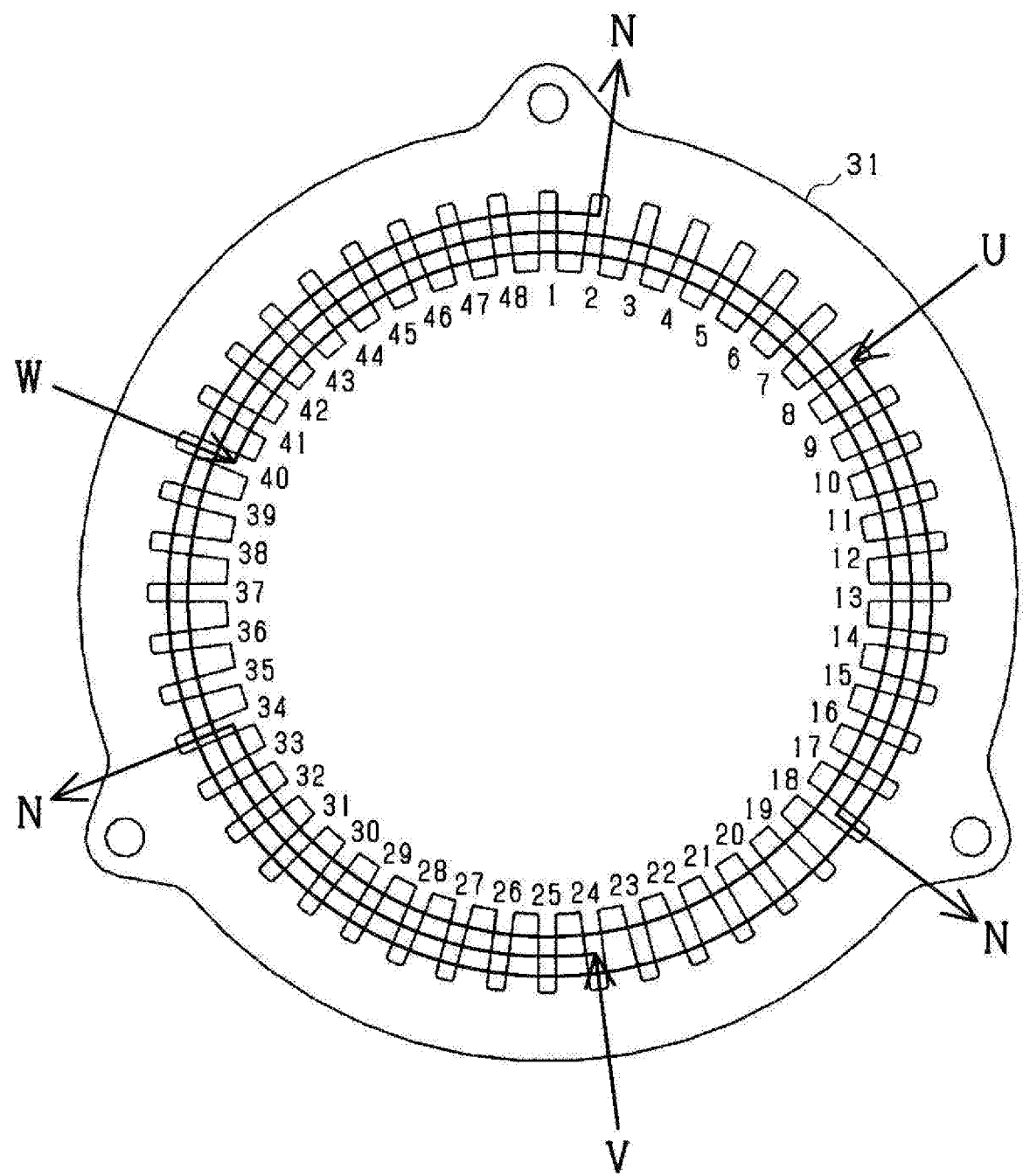
FIG. 13 is a plan view which illustrates circumferential locations of phase terminals and neutral points.

FIG. 13 illustrates circumferential locations of the phase terminals T1, T2, and T3 (which will also be denoted by "U", "V", and "W" in FIG. 13 and the following drawings), and the neutral points N of the U-, V-, and W-phase coils 32U, 32V, and 32W.

In FIG. 13, the circumferential location of an end of the U-phase coil 32U which leads to the U-phase terminal U coincides with the #8 slot. The circumferential location of an end of the V-phase coil 32V which leads to the V-phase terminal V coincides with the #24 slot. The circumferential location of an end of the W-phase coil 32W which leads to the W-phase terminal W coincides with the #40 slot. The above ends (which will also be referred to below as first ends) of the U-phase coil 32U, the V-phase coil 32V, and the W-phase coil 32W are arranged at an equal angular interval away from each other in the circumferential direction of the stator core 31. In other words, each of the ends of the U-phase coil 32U, the V-phase coil 32V, and the W-phase coil 32W are located to have a phase difference of 120° between itself and the others. Similarly, ends (which will also be referred to below as second ends) of the phase coils 32U, 32V, and 32W leading to the neutral point N are arranged at an equal angular interval away from each other in the circumferential direction of the stator core 31 to have a phase difference of 120° therebetween. In summary, the first ends of the phase coils 32U, 32V, and 32W which lead to the U-phase, V-phase, and W-phase terminals U, V, and W are arranged to have a phase difference of [480°/(the number of pole pairs×the number of phase coils connected in parallel to each other)].

The rotating electrical machine 10 in this embodiment offers the following beneficial advantages.

The rotating electrical machine 10 is designed to have two or more reversing connecting sections in each of the phase coils 32U, 32V, and 32W. Each of the reversing connecting sections of each of the phase coils 32U, 32V, and 32W is provided by one (which will also be referred to below as a second connecting conductor) of the connecting sections A1 to A15 which connects the $(i+1)^{th}$ unit coil to the $(i+2)^{th}$ unit coil, as counted from a corresponding one of the U-, V-, and W-phase terminals T1, T2, and T3 in the joining sequence, and orients a direction in which the second connecting conductor extends from the $(i+1)^{th}$ unit coil to the $(i+2)^{th}$ unit coil to be opposite to that in which one (which will also be referred to below as a first connecting conductor) of the connecting sections which connects the $i^{th}$ unit coil to $(i+1)^{th}$ unit coil, as counted from a corresponding one of the U-, V-, and W-phase terminals T1, T2, and T3 in the joining sequence, extends from the $i^{th}$ unit coil to $(i+1)^{th}$ unit coil in the circumferential direction of the stator core 31 (i.e., the stator winding 32). In other words, each of the phase coils 32U, 32V, and 32W is folded or reversed in orientation thereof two times or more in the circumferential direction of the stator core 31. This causes ones of the unit coils U1 to U16, V1 to V16, or W1 to W16 of the same phase which are close to each other, as viewed in terms of the joining sequence, to be disposed in the same slot of the stator core 31, thereby eliminating a risk that a potential difference between the unit coils U1 to U16, V1 to V16, or W1 to W16 may be increased. This ensures a desired degree of electrical insulation of the stator 30.

Each of the phase coils 32U, 32V, and 32W, as already described, includes the four series-connected coil groups each of which is equipped with the reversing connecting sections, thereby resulting in an increased number of direction-reversed portions of a corresponding one of the phase coils 32U, 32V, and 32W, which enhances a decrease in potential difference between the unit coils.

Each of the series-connected coil groups of each of the phase coils 32U, 32V, and 32W, as described above, includes a respective series-connected four of the unit coils U1 to U16, V1 to V16, or W1 to W16. The following discussion will refer to the unit coils U1 to U4 as the respective four of the unit coils U1 to U16, V1 to V16, or W1 to W16 for the sake of convenience. The series-connected coil group including the unit coils U1 to U4 is equipped with the first connecting section connecting the first coil unit (i.e., the coil unit U1) and the second coil unit (i.e., the coil unit U2), as counted from the U-phase terminal T1 in terms of the joining sequence, the second connecting section connecting the second coil unit (i.e., the coil unit U2) and the third coil unit (i.e., the coil unit U3), as counted from the U-phase terminal T1 in terms of the joining sequence, and the third connecting section connecting the third coil unit (i.e., the coil unit U3) and the fourth coil unit (i.e., the coil unit U4), as counted from the U-phase terminal T1 in terms of the joining sequence. The third and fourth connecting sections are selected as the reversing connecting sections. This causes ones of the unit coils U1 to U4 which are arranged close to each other in the joining sequence to be disposed in the same slot 35, thereby reducing a potential difference between the unit coils U1 to U4. In such a case, each pole pair may include the two reversing connecting sections in the circumferential direction.

Each of the phase coils 32U, 32V, and 32W is, as described above, made up of a total of sixteen (m) coil units (i.e., U1 to U16, V1 to V16, or W1 to W16) connected in series with each other from a corresponding one of the U-phase, V-phase, and W-phase terminals T1, T2, and T3 to the neutral point N. The two or more reversing connecting sections are placed in a range of a full circumference of the stator core 31. This also serves to reduce the potential difference between the unit coils in an intermediate portion between the phase terminal and the neutral point.

Each of the unit coils is made of a conductor wound in the form of a lap winding and disposed in the slots 35 in the form of multiple layers stacked in the radial direction of the stator core 31. A respective two of the unit coils which are arranged adjacent each other in the circumferential direction of the stator core 31 and located on the radially innermost side or the radially outermost side of the stator core 31 are connected together using the connecting section. The unit coils of the same phase are disposed in a respective two of the slots 35 for each pole. Each of the connecting sections is designed to connect two of the slots 35 which are arranged at a j– or (j+1)-slot pitch away from each other. This is useful in reversing the connecting directions (i.e., the circumferential direction) of the connecting sections to minimizes the length of the connecting sections.

Each of the unit coils (i.e., U1 to U16, V1 to V16, or W1 to W16) is made of a plurality of conductor segments 50. This enables the length of the turn 52 connecting the two straight sections 51 of each of the conductor segments 50 or the interval between the excess portions 53 of the straight sections 51 to be changed in the circumferential direction in order to change the slot pitches for the unit coils or the connecting sections.

The phase coils 32U, 32V, and 32W are arranged to have a given phase difference between the ends thereof close to, in other words, leading to the phase terminals T1, T2, and T3. The given phase difference is provided to meet a relation of [480°/(the number of pole pairs×the number of arrays of the unit coils connected in parallel to each other)]. This reduces a potential difference between a respective adjacent two of the phase coils 32U, 32V, and 32W.

The rotating electrical machine 10 is not of a flat type, but a long axis type suitable for high voltage and therefore essentially required to decrease the potential difference between the phase coils. The above structure of the rotating electrical machine 10 is suitable for decreasing the potential difference.

The stator winding 32 is, as described above, of a segment-made structure. Such a structure enables the height of the coil ends to be decreased to increase the power density of the rotating electrical machine 10. The increase in power density may also be achieved by decreasing the thickness of an insulating layer of the stator winding 32. It is, however, essential to decrease the potential difference between the adjacent phase coils in order to ensure a required degree of electrical insulation of the stator winding 32. The above structure of the stator winding 32 is, therefore, useful to obtain the required degree of electrical insulation of the stator winding 32.

First Modification of the First Embodiment

The first modification of the structure of the stator winding 32 will be described below. Each of the phase coils 32U, 32V, and 32W is, like in the above first embodiment, made up of the sixteen unit coils U1 to U16, V1 to V16, or W1 to W16.

Figure 14:
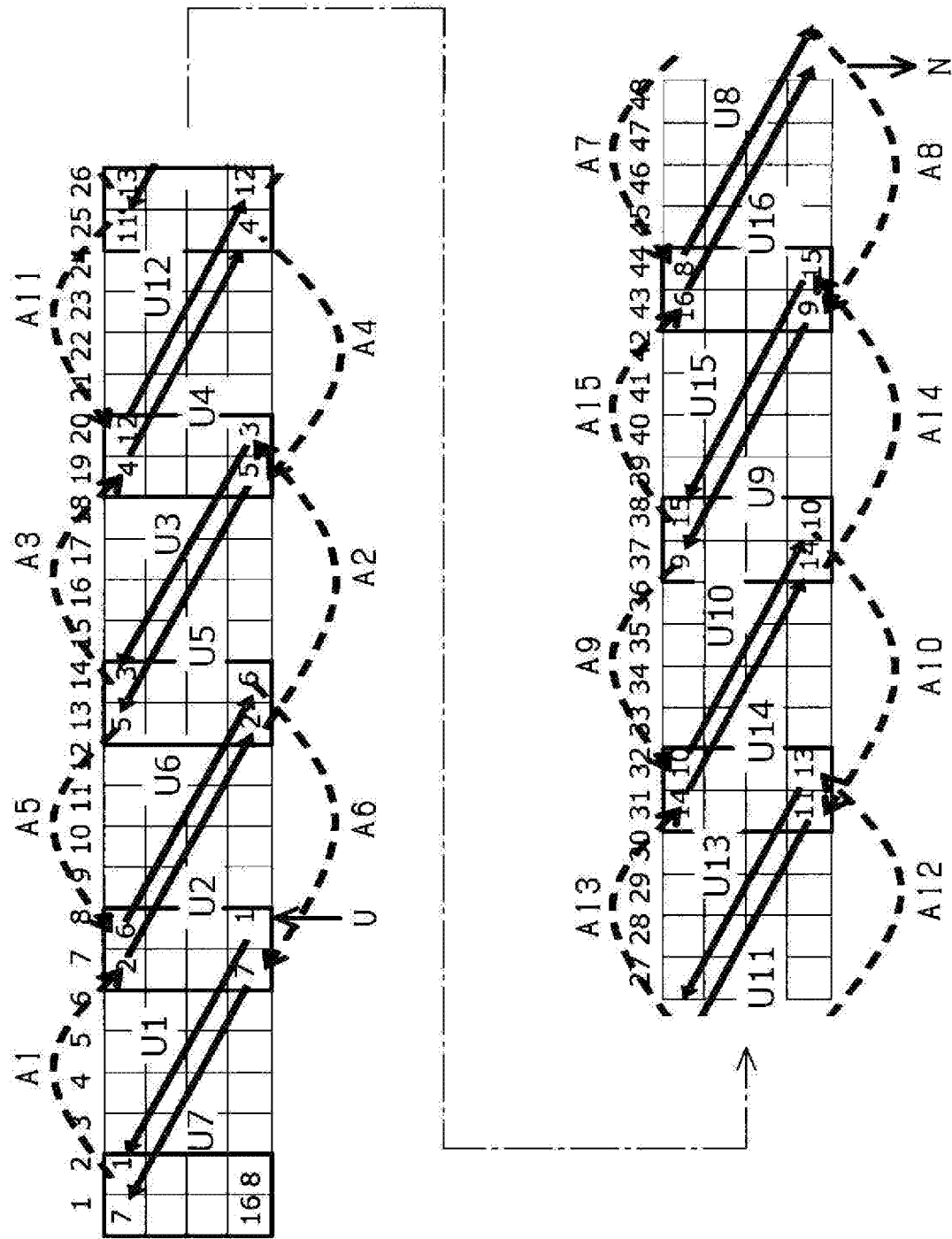
FIG. 14 is a developed plan view which shows a sequence in which unit coils are joined together in a first modification of the first embodiment.

FIG. 14 is a developed plan view which illustrates the sequence of steps in which the unit coils U1 to U16, V1 to V16, or W1 to W16 are joined to each other. For the sake of convenience, FIG. 14 shows only the U-phase coil 32U in the same way as in FIG. 8.

Referring only to the unit coils U1 to U8 of the U-phase coil 32U for the sake of simplicity, the unit coil U1 is disposed in the #1 slot and the #8 slot. The unit coil U2 is disposed in the #7 and #13 slots. The unit coil U3 is disposed in the #14 and #20 slots. The unit coil U4 is disposed in the #9 and #25 slots. The unit coil U5 is disposed in the #13 and #19 slots. The unit coil U6 is disposed in the #8 and #14 slots. The unit coil U7 is disposed in the #1 and #7 slots. The unit coil U8 is disposed in the #2 and #44 slots. The connecting section A1 extends or connects between the #2 and #7 slots. The connecting section A2 connects between the #13 and #20 slots. The connecting section A3 connects between the #14 and #19 slots. The connecting section A4 extends or connects between the #19 and #25 slots. The connecting section A5 connects between the #8 and #13 slots. The connecting section A6 connects between the #7 and #14 slots. The connecting section A7 connects between the #1 and #44 slots. Between the unit coil U8 and the following unit coil U9, the connecting section A8 connects between the #2 and #43 slots.

Each of the unit coils U1 to U8 extends by a 6-slot pitch. At least two of the connecting sections A1 to A7 connecting the unit coils U1 to U8 together are different in slot pitch from each other. Specifically, in this modification, each of the connecting sections A1, A3, A5, and A7 connects between two of the slots 35 (i.e., two coil sides) which are located at a 6-slot pitch away from each other. Each of the connecting sections A2 and A6 connects between two of the slots 35 which are located at a 7-slot pitch away from each other.

If the number of the slots 35 corresponding to the pole pitch (i.e., a 6-slot pitch) is defined as "j", each of the unit coils U1 to U8 has coil sides arranged at a j-slot pitch away from each other. Each of the connecting sections A1, A3, A5, and A7 connects between the slots 35 arranged at a (j–1)-slot pitch away from each other. The connecting section A4 connects between the slots 35 arranged at a j-slot pitch away from each other. The connecting sections A2 and A6 each connect between the slots 35 arranged at a (j+1)-slot pitch away from each other.

In terms of the joining sequence from the U-phase terminal T1, directions (i.e., the connecting directions) in which the connecting sections A1 to A7 of the unit coils U1 to U8 circumferentially extend are not identical with each other. Specifically, the connecting sections A1 and A3 extend in the clockwise direction (i.e., the rightward direction in FIG. 14). The connecting sections A4 to A7 extend in the counterclockwise direction (i.e., the leftward direction in FIG. 14). The unit coils U1 to U8 are, therefore, turned or folded several times, in other words, the direction in which the unit coils U1 to U8 extend is reversed several times until they are wound over the whole of the circumference of the stator core 31.

Specifically, the direction in which the connecting section A4 extends from the unit coil U4 to the unit coil U5 is opposite to that in which the connecting section A3 extends from the unit coil U3 to the unit coil U4. The connecting section A4 is, therefore, used as the reversing connecting section.

Although not described in detail, the unit coils U9 to U16 following the unit coils U1 to U8 have the same arrangements as those of the unit coils U1 to U8. In brief, the U-phase coil 32U includes two series-connected coil groups each of which is made up of a respective eight of the unit coils U1 to U16. The two series-connected coil groups are connected in series with each other to complete the U-phase coil 32U. Each of the series-connected coil groups includes the one reversing connecting sections.

Figure 15:
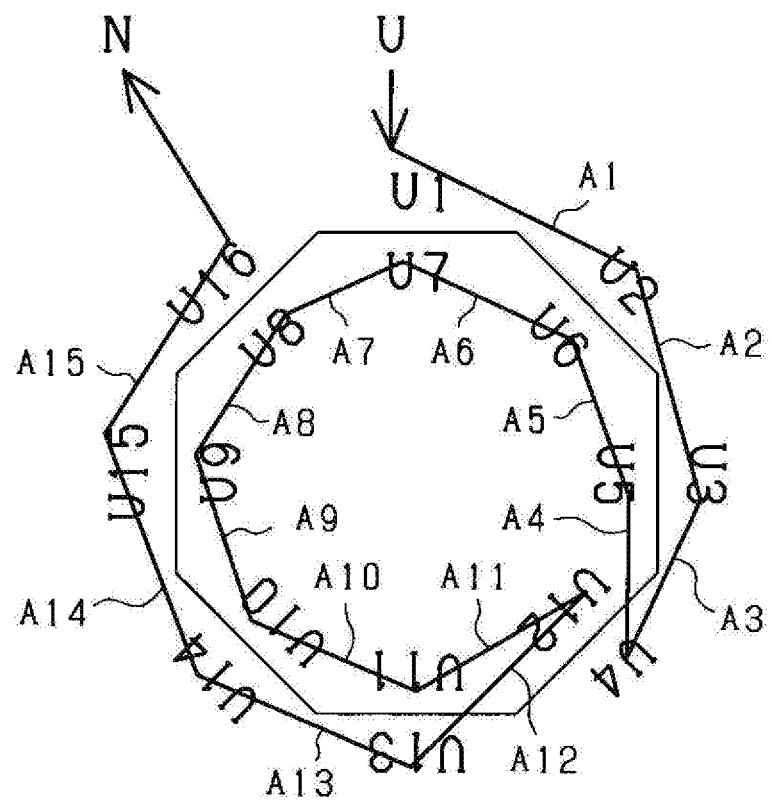
FIG. 15 is a view which illustrates circumferential locations of unit coils and orientations of connecting conductors connecting the unit coils together in a first modification of the first embodiment.

FIG. 15 is a view which illustrates circumferential locations of the unit coils U1 to U16 of the U-phase coil 32U and the connecting directions of the connecting sections A1 to A15 of the U-phase coil 32U. The connecting sections A1 to A3 of the U-phase coil 32U are, as can be seen in the drawing, oriented in the clockwise direction between the U-phase terminal T1 and the neutral point N. The connecting directions of the connecting sections A4 to A11 are oriented in the counterclockwise direction. The connecting directions of the connecting sections A12 to A15 are oriented in the clockwise direction again. Ones of the unit coils U1 to U16 which are located relatively close to each other are, therefore, disposed in the same slot 35, thereby reducing a potential difference between the unit coils U1 to U16.

In FIG. 14, on the radially innermost side (i.e., the lower side in the drawing) of the stator core 31, each of the connecting sections A2, A4, A6, . . . connects between the slots 35 arranged at a 6-slot pitch or a 7-slot pitch away from each other. On the radially outermost side (i.e., the upper side in the drawing) of the stator core 31, each of the connecting sections A1, A3, A5, A7, . . . connects between the slots 35 arranged at a 5-slot pitch away from each other. If the pole pitch is generally defined as j (=a 6-slot pitch), each of the connecting sections A2, A4, A6, . . . on the radially innermost side of the stator core 31 connects between the slots 35 arranged at the (j+1)-slot pitch away from each other. Each of the connecting sections A1, A3, A5, A7, . . . connects between the slots 35 arranged at the (j−1)-slot pitch away from each other.

The above slot pitches of the connecting sections A1 to A15 may alternatively be reversed between the radially outer side and the radially inner side of the stator core 31. Specifically, each of the connecting sections on the radially innermost side of the stator core 31 may connect between the slots 35 arranged at the (j−1)-slot pitch away from each other. Each of the connecting sections on the radially outermost side of the stator core 31 may connect between the slots 35 arranged at the j− or (j+1)-slot pitch away from each other.

Figure 16:
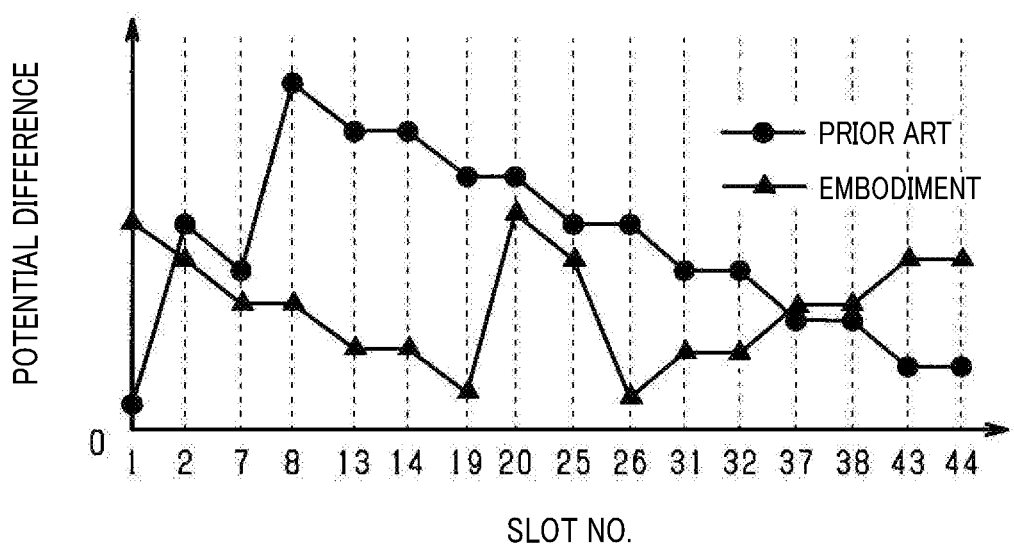
FIG. 16 is a graph which represents numbers of slots in which unit coils are disposed and potential differences between the unit coils in a first modification of the first embodiment.

FIG. 16 is a graph which demonstrates reductions in potential difference between the unit coils of the stator winding 32 in this modification and a conventional stator winding. The conventional stator winding is designed to have the same structure as that in FIGS. 10 and 11. The graph represents numbers of slots in which the unit coils U1 to U16 of the U-phase coil 32U of each of the stator winding 32 in this embodiment and the conventional stator winding are disposed and a potential difference between two of the unit coils U1 to U16 which are disposed in each of the slots. The numbers of the unit coils U1 to U16 disposed in the slots in this embodiment are the same as in FIG. 14.

In the stator winding 32 in this embodiment, the series-connected coil group made up of the unit coils U1 to U8 is, as apparent from the above discussion, designed to have the reversing connecting section. Similarly, the series-connected coil group made up of the unit coils U9 to U16 has the reversing connecting section. Each of the series-connected coil groups, therefore has a decreased potential difference between the unit coils disposed in the same slot.

Although not illustrated, the V-phase coil 32V and the W-phase coil 32W have the same structure as that of the U-phase coil 32U described above. Only one or two of the phase coils 32U, 32V, and 32W may be designed to have the above structure.

Second Modification of the First Embodiment

The second modification of the structure of the stator winding 32 will be described below. Each of the phase coils 32U, 32V, and 32W is, like in the above first embodiment, made up of the sixteen unit coils U1 to U16, V1 to V16, or W1 to W16.

Figure 17:
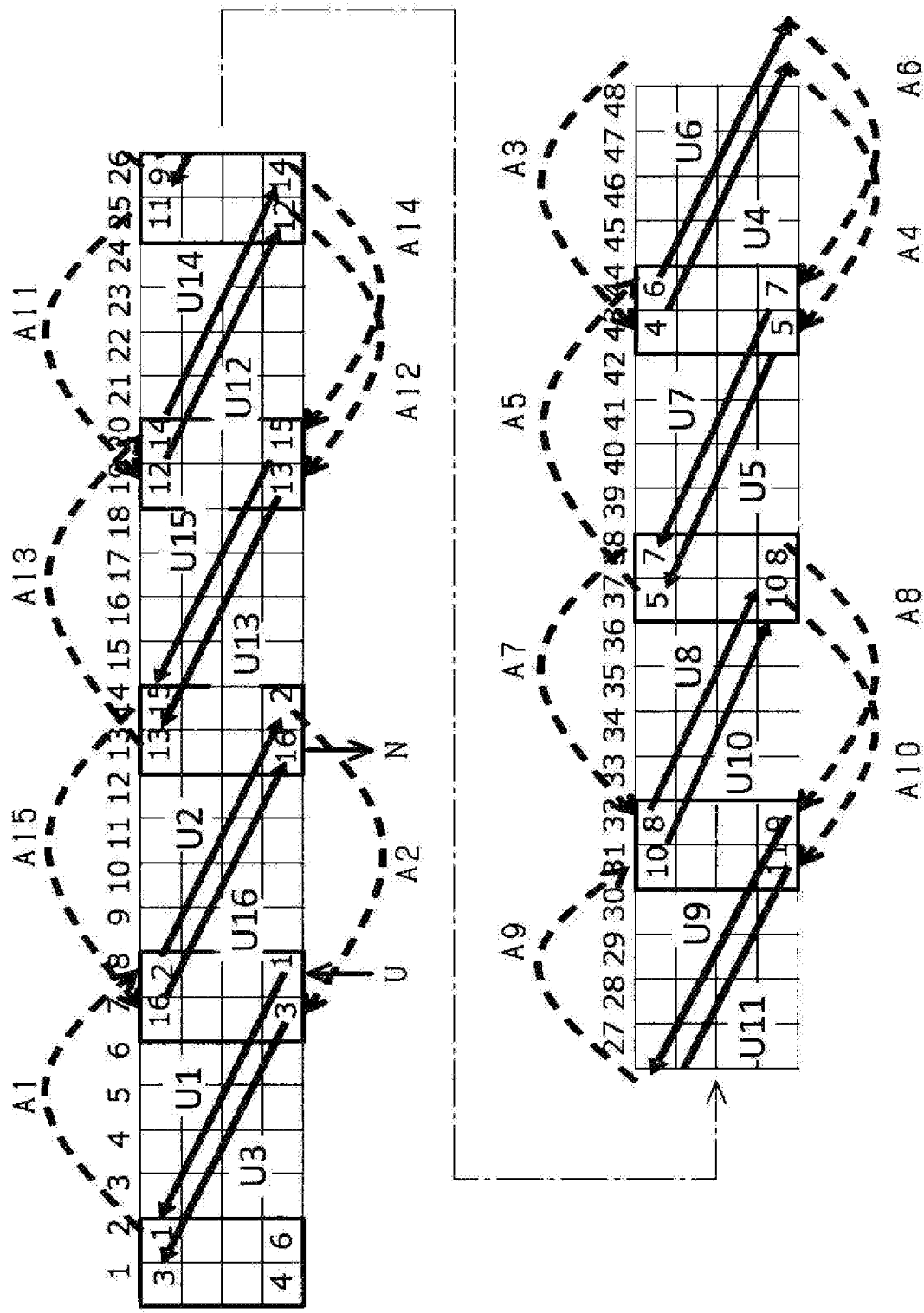
FIG. 17 is a developed plan view which shows a sequence in which unit coils are joined together in a second modification of the first embodiment.

FIG. 17 is a developed plan view which illustrates the sequence of steps in which the unit coils 1 to U16, V1 to V16, or W1 to W16 are joined to each other. For the sake of convenience, FIG. 17 shows only the U-phase coil 32U in the same way as in FIG. 8.

Referring only to the unit coils U1 to U8 of the U-phase coil 32U for the sake of simplicity, the unit coil U1 is disposed in the #2 slot and the #8 slot. The unit coil U2 is disposed in the #8 and #14 slots. The unit coil U3 is disposed in the #1 and #7 slots. The unit coil U4 is disposed in the #1 and #43 slots. The unit coil U5 is disposed in the #37 and #43 slots. The unit coil U6 is disposed in the #2 and #44 slots. The unit coil U7 is disposed in the #38 and #44 slots. The unit coil U8 is disposed in the #32 and #38 slots.

The connecting section A1 extends or connects between the #2 and #8 slots. The connecting section A2 connects between the #7 and #14 slots. The connecting section A3 connects between the #1 and #43 slots. The connecting section A4 extends or connects between the #1 and #43 slots. The connecting section A5 connects between the #37 and #44 slots. The connecting section A6 connects between the #2 and #44 slots. The connecting section A7 connects between the #32 and #38 slots. Between the unit coil U8 and the following unit coil U9, the connecting section A8 connects between the #32 and #38 slots.

Each of the unit coils U1 to U8 extends by a 6-slot pitch. One(s) of the connecting sections A1 to A7 connecting the unit coils U1 to U8 together are different in slot pitch from the others. Specifically, in this modification, each of the connecting sections A1, A3, A4, A6, and A7 connects between two of the slots 35 (i.e., two coil sides) which are located at a 6-slot pitch away from each other. Each of the connecting sections A2 and A5 connects between two of the slots 35 which are located at a 7-slot pitch away from each other.

If the number of the slots 35 corresponding to the pole pitch (i.e., a 6-slot pitch) is defined as "j", each of the unit coils U1 to U8 has coil sides arranged at a j-slot pitch away from each other. Each of the connecting sections A1, A3, A4, A6, and A7 connects between the slots 35 arranged at a j-slot pitch away from each other. Each of the connecting section A4 and A5 connects between the slots 35 arranged at a (j+1)-slot pitch away from each other.

In terms of the joining sequence from the U-phase terminal T1, directions (i.e., the connecting directions) in which the connecting sections A1 to A7 of the unit coils U1 to U8 circumferentially extend are not identical with each other. Specifically, the connecting section A1 extends in the clockwise direction (i.e., the rightward direction in FIG. 17). The connecting sections A2 to A4 extend in the counterclockwise direction (i.e., the leftward direction in FIG. 17). The connecting section A5 extends in the clockwise direction. The connecting sections A6 to A7 extend in the counterclockwise direction. The unit coils U1 to U8 are, therefore, turned or folded several times, in other words, the direction in which the unit coils U1 to U8 extend is reversed in orientation thereof several times until they are wound over the whole of the circumference of the stator core 31.

Specifically, the direction or orientation of the connecting section A2 is opposite to that of the connecting section A1. The orientation of the connecting section A5 is opposite to that of the connecting section A4. The orientation of the connecting section A6 is opposite to that of the connecting section A5. The connecting sections A2, A5, and A6 are, therefore, used as the reversing connecting sections.

Although not described in detail, the unit coils U9 to U16 following the unit coils U1 to U8 have the same arrangements as those of the unit coils U1 to U8. In brief, the connecting sections A10, A13, and A14 of the connecting sections A9 to A15 connecting the unit coils U9 to U16 are used as the reversing connecting sections. In terms of a relation to the connecting section A8 connecting the unit coil U8 that is the last in the first half group and the unit coil A9 that is the first in the second half group of the unit coils U1 to U16, the connecting section A9 following the connecting section A8 is used as the reversing connecting section. The connecting section A9 is disposed in the slots 35 arranged at a 5-slot pitch away from each other.

Figure 18:
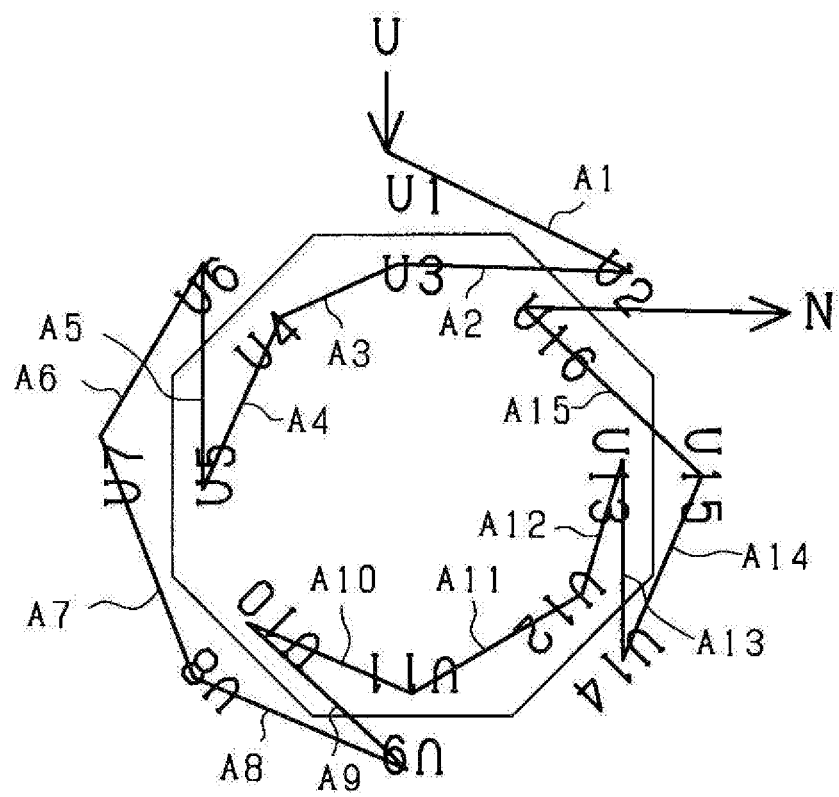
FIG. 18 is a view which illustrates circumferential locations of unit coils and orientations of connecting conductors connecting the unit coils together in a second modification of the first embodiment.

FIG. 18 is a view which illustrates circumferential locations of the unit coils U1 to U16 of the U-phase coil 32U and the connecting directions of the connecting sections A1 to A15 of the U-phase coil 32U. Ones of the unit coils U1 to U16 which are located relatively close to each other are, as can be seen in the drawing, disposed in the same slot 35, thereby reducing a potential difference between the unit coils U1 to U16.

In FIG. 17, on the radially innermost side (i.e., the lower side in the drawing) of the stator core 31, each of the connecting sections A2, A4, A6, . . . connects between the slots 35 arranged at a 6-slot pitch or a 7-slot pitch away from each other. On the radially outermost side (i.e., the upper side in the drawing) of the stator core 31, each of the connecting sections A1, A3, A5, A7, . . . connects between the slots 35 arranged at a 5-slot pitch, a 6-slot pitch, or a 7-slot pitch away from each other. If the pole pitch is generally defined as j (=a 6-slot pitch), each of the connecting sections A2, A4, A6, . . . on the radially innermost side of the stator core 31 connects between the slots 35 arranged at the j- or (j+1)-slot pitch away from each other. Each of the connecting sections A1, A3, A5, A7, . . . connects between the slots 35 arranged at the j-, (j+1)-, or (j−1) slot pitch away from each other.

The above slot pitches of the connecting sections A1 to A15 may alternatively be reversed between the radially outer side and the radially inner side of the stator core 31.

Figure 19:
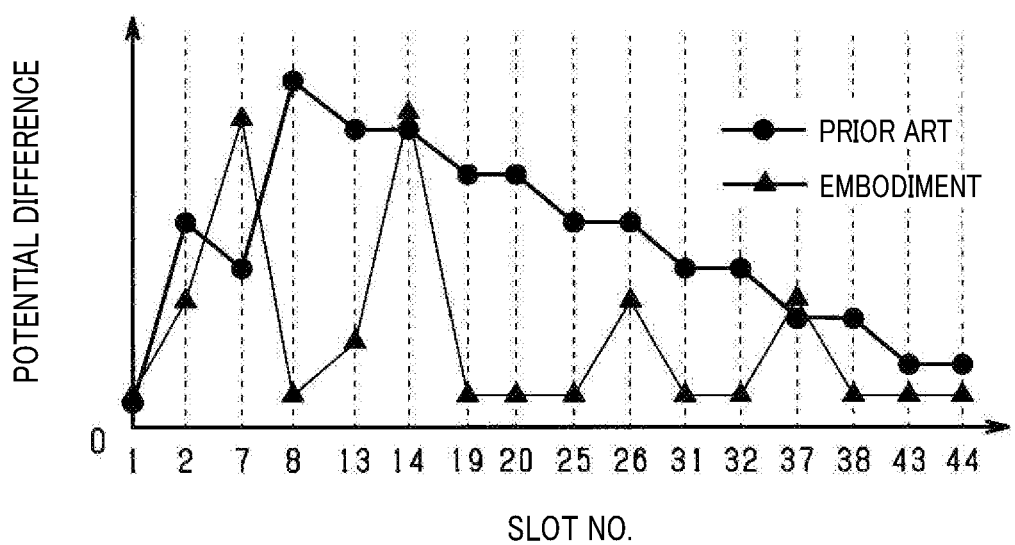
FIG. 19 is a graph which represents numbers of slots in which unit coils are disposed and potential differences between the unit coils in a second modification of the first embodiment.

FIG. 19 is a graph which demonstrates reductions in potential difference between the unit coils of the stator winging 32 in this modification and a conventional stator winding. The conventional stator winding is designed to have the same structure as that in FIGS. 10 and 11. The graph represents numbers of slots in which the unit coils U1 to U16 of the U-phase coil 32U of each of the stator winding 32 in this embodiment and the conventional stator winding are disposed and a potential difference between two of the unit coils U1 to U16 which are disposed in each of the slots. The numbers of the unit coils U1 to U16 disposed in the slots in this embodiment are the same as in FIG. 17.

As apparent from the above discussion, the U-phase coil 32U made up of the unit coils U1 to U16 in this modification is designed to have the two or more reversing connecting sections. This results in a decreased potential difference between the unit coils disposed in the same slot.

Although not illustrated, the V-phase coil 32V and the W-phase coil 32W have the same structure as that of the U-phase coil 32U described above. Only one or two of the phase coils 32U, 32V, and 32W may be designed to have the above structure.

Second Embodiment

Figure 20:
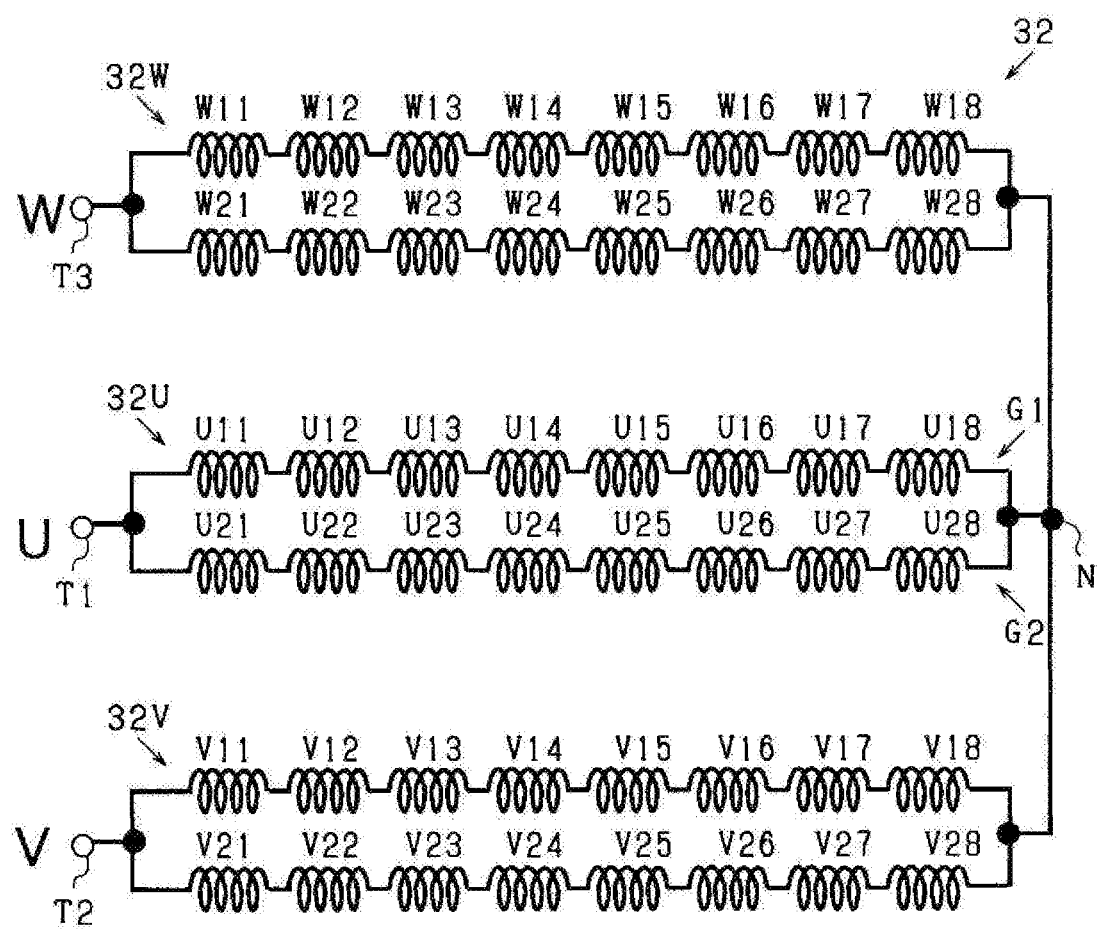
FIG. 20 is a developed view which illustrates a stator winding according to the second embodiment.

The stator winding 32 in the second embodiment will be described below which is different from the first embodiment in that each of the U-, V-, and W-phase coils 32U, 32V, and 32W is designed to have a double parallel coil layout. FIG. 20 illustrates the double parallel coil layout of the U-, V-, and W-phase coils 32U, 32V, and 32W.

The U-phase coil unit 32U, as clearly illustrated in FIG. 20, includes two series-connected coil groups: a first series-connected coil group G1 and a second series-connected coil group G2. The first series-connected coil group G1 is made up of eight unit coils: the unit coils U11, U12, U13, U14, U15, U16, U17, and U18 which are electrically connected in series with each other. The second series-connected coil group G2 is made up of eight unit coils: the unit coils U21, U22, U23, U24, U25, U26, U27, and U28 which are electrically connected in series witch each other. The first series-connected coil group G1 and the second series-connected coil group G2 are connected in parallel to each other.

Similarly, the V-phase coil unit 32V includes two series-connected coil groups: a first series-connected coil group G1 and a second series-connected coil group G2. The first series-connected coil group G1 is made up of eight unit coils: the unit coils V11, V12, V13, V14, V15, V16, V17, and V18 which are electrically connected in series with each other. The second series-connected coil group G2 is made up of eight unit coils: the unit coils V21, V22, V23, V24, V25, V26, V27, and V28 which are electrically connected in series witch each other. The first series-connected coil group G1 and the second series-connected coil group G2 are connected in parallel to each other. The W-phase coil unit 32W includes two series-connected coil groups: a first series-connected coil group G1 and a second series-connected coil group G2. The first series-connected coil group G1 is made up of eight unit coils: the unit coils W11, W12, W13, W14, W15, W16, W17, and W18 which are electrically connected in series with each other. The second series-connected coil group G2 is made up of eight unit coils: the unit coils W21, W22, W23, W24, W25, W26, W27, and W28 which are electrically connected in series witch each other. The first series-connected coil group G1 and the second series-connected coil group G2 are connected in parallel to each other.

Figure 21:
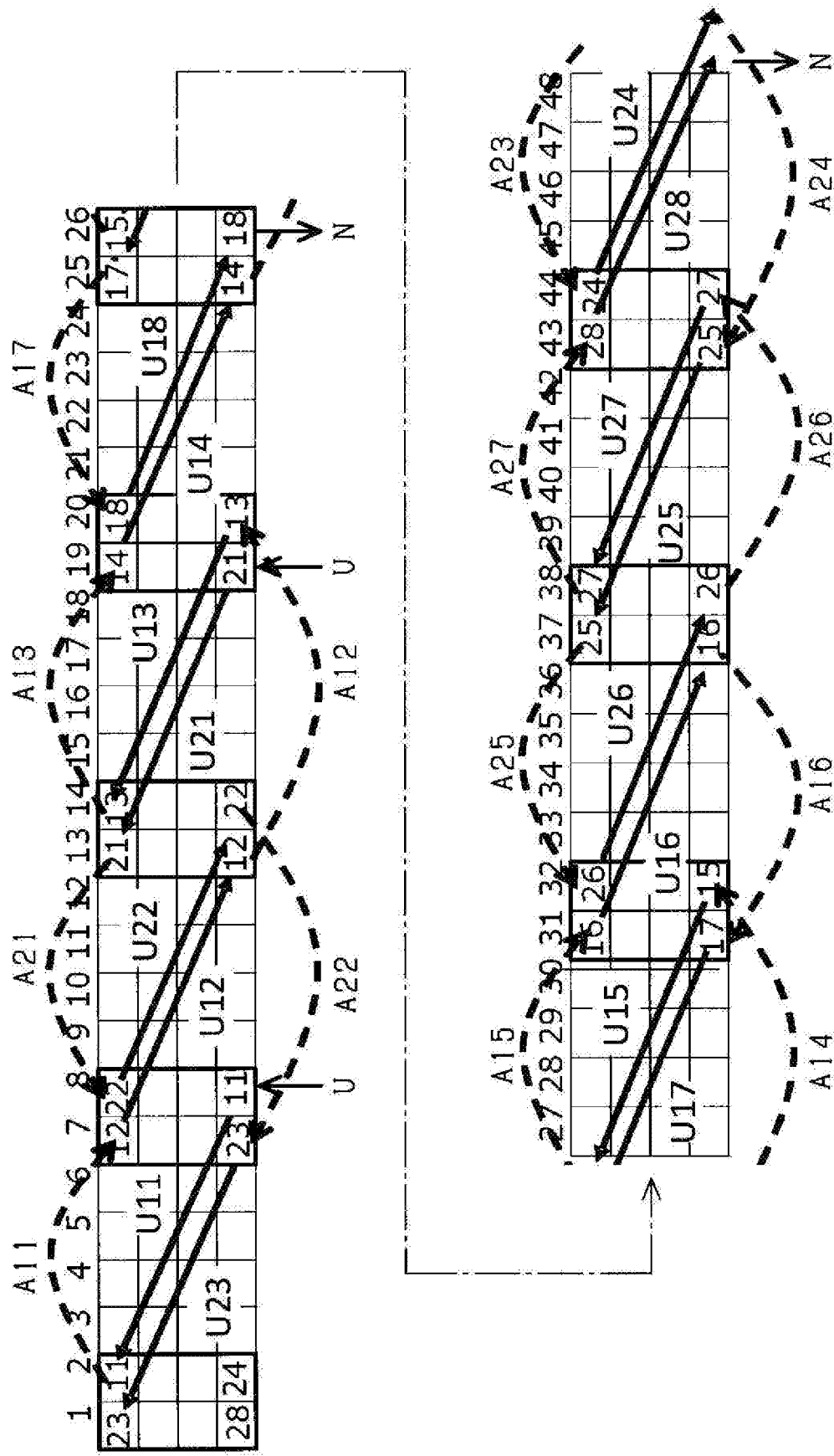
FIG. 21 is a developed plan view which shows a sequence in which unit coils are joined together in the second embodiment.

FIG. 21 is a developed plan view which illustrates the sequence of steps in which the unit coils U11 to U28 of the U-phase coil 32U are joined to each other. For the sake of convenience, FIG. 21 shows only the U-phase coil 32U in the same way as in FIG. 8.

Referring only to the first series-connected coil group G1 of the U-phase coil 32U for the sake of simplicity, the unit coil U11 is disposed in the #2 slot and the #8 slot. The unit coil U12 is disposed in the #7 and #13 slots. The unit coil U13 is disposed in the #14 and #20 slots. The unit coil U14 is disposed in the #9 and #25 slots. The unit coil U15 is disposed in the #26 and #32 slots. The unit coil U16 is disposed in the #31 and #37 slots. The unit coil U17 is disposed in the #25 and #31 slots. The unit coil U18 is disposed in the #20 and #26 slots.

The connecting section A11 extends or connects between the #2 and #7 slots. The connecting section A12 connects between the #13 and #20 slots. The connecting section A13 connects between the #14 and #19 slots. The connecting section A14 extends or connects between the #25 and #32 slots. The connecting section A15 connects between the #26 and #31 slots. The connecting section A16 connects between the #31 and #37 slots. The connecting section A17 connects between the #20 and #25 slots.

Each of the unit coils U11 to U18 extends by a 6-slot pitch. One(s) of the connecting sections A11 to A17 connecting the unit coils U11 to U18 together are different in slot pitch from the others. Specifically, in this embodiment, each of the connecting sections A11, A13, A15, and A17 connects between two of the slots 35 (i.e., two coil sides) which are located at a 5-slot pitch away from each other. The connecting section A16 connects between two of the slots 35 which are located at a 6-slot pitch away from each other.

Each of the connecting sections A12 and A14 connects between two of the slots 35 which are located at a 7-slot pitch away from each other.

If the number of the slots 35 corresponding to the pole pitch (i.e., a 6-slot pitch) is defined as "j", each of the unit coils U11 to U18 has coil sides arranged at a j-slot pitch away from each other. Each of the connecting sections A11, A13, A15, and A17 connects between the slots 35 arranged at a (j−1)-slot pitch away from each other. The connecting section A16 connects between the slots 35 arranged at a j-slot pitch away from each other. Each of the connecting sections A12 and A14 connects between the slots 35 arranged at a (j+1)-slot pitch away from each other.

In terms of the joining sequence from the U-phase terminal T1, directions (i.e., the connecting directions) in which the connecting sections A11 to A17 of the unit coils U11 to U18 circumferentially extend are not identical with each other. Specifically, the connecting sections A11 to A15 extend in the clockwise direction (i.e., the rightward direction in FIG. 21). The connecting sections A16 to A17 extend in the counterclockwise direction (i.e., the leftward direction in FIG. 21). The unit coils U11 to U18 are, therefore, turned or folded several times, in other words, the direction in which the unit coils U11 to U18 extend is reversed in orientation thereof until they are wound over the whole of the circumference of the stator core 31.

Specifically, the direction in which the connecting section A16 extends from the unit coil U16 to the unit coil U17 is opposite to that in which the connecting section A15 extends from the unit coil U15 to the unit coil U16. The connecting section A16 is, therefore, used as the reversing connecting section.

Although not described in detail, the unit coils U21 to U28 of the second series-connected coil group G2 are reverse in circumferential orientation to the above described unit coils U11 to U18 of the first series-connected coil grout G1, but however, the slot pitches of the unit coils U21 to U28 and the connecting sections A18 to A27 are identical with those in the first series-connected group G1. In other words, the U-phase coil 32U in the second embodiment includes the first and second series-connected coil groups G1 and G2 each of which is made up of eight unit coils connected in series with each other. Each of the first and second series-connected coil groups G1 and G2 includes the one reversing connecting section.

Figure 22:
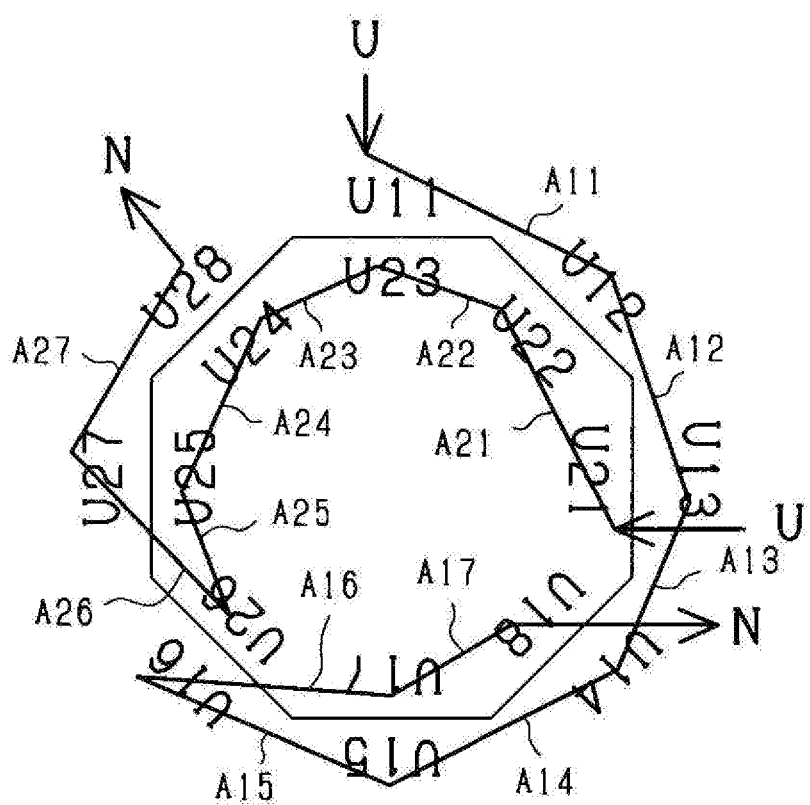
FIG. 22 is a view which illustrates circumferential locations of unit coils and orientations of connecting conductors connecting the unit coils together in the second embodiment.

FIG. 22 is a view which illustrates circumferential locations of the unit coils U11 to U18 of the first series-connected coil group G1 and the unit coils U21 to U28 of the second series-connected coil group G2 of the U-phase coil 32U and also illustrates the connecting directions of the connecting sections A11 to A27 of the U-phase coil 32U.

In the first series-connected coil group G1, the connecting directions of the connecting sections A11 to A15 of the U-phase coil 32U are, as can be seen in FIG. 22, oriented in the clockwise direction between the U-phase terminal T1 and the neutral point N. The connecting directions of the connecting sections A16 to A17 are oriented in the counterclockwise direction. In the second series-connected coil group G2, the connecting directions of the connecting sections A21 to A25 are oriented in the counterclockwise direction between the U-phase terminal T1 and the neutral point N. The connecting directions of the connecting sections A26 to A27 are oriented in the clockwise direction. The first and second series-connected coil groups G1 and G2 are each wound to have the reversing connecting sections in the above way, so that ones of the unit coils U11 to U28 which are located close to the U-phase terminal T1 or the neutral point N are disposed in the same slot 35, thereby avoiding an undesirable rise in potential difference between the unit coils U11 to U28.

Each of the first and second series-connected coil groups G1 and G2 occupies an angular range of the stator core 31 which is smaller than a full circumference of the stator core 31. The first and second series-connected coil groups G1 and G2 are offset from each other in the circumferential direction of the stator core 31 to have the U-phase coil 32U itself occupy the whole of the circumference of the stator core 31.

In FIG. 21, on the radially innermost side (i.e., the lower side of the stator core 31 as viewed in the drawing) of the stator core 31, each of the connecting sections A12, A14, A16, . . . connects between the slots 35 arranged at a 6-slot pitch or a 7-slot pitch away from each other. On the radially outermost side (i.e., the upper side of the stator core 31 as viewed in the drawing) of the stator core 31, each of the connecting sections A11, A13, A15, A17, . . . connects between the slots 35 arranged at a 5-slot pitch away from each other. If the pole pitch is generally defined as j (=a 6-slot pitch), each of the connecting sections A12, A14, A16, . . . on the radially innermost side of the stator core 31 connects between the slots 35 arranged at the j− or (j+1)-slot pitch away from each other. Each of the connecting sections A11, A13, A15, A17, . . . connects between the slots 35 arranged at the (j−1) slot pitch away from each other.

The above slot pitches of the connecting sections A11 to A17 and A21 to A27 may alternatively be reversed between the radially outer side and the radially inner side of the stator core 31. Specifically, the connecting sections on the radially innermost side of the stator core 31 may connect between the slots 35 arranged at the (j−1)-slot pitch away from each other. The connecting sections on the radially outermost side of the stator core 31 may connect between the slots 35 arranged at the j− or (j+1)-slot pitch away from each other.

Although not illustrated, the V-phase coil 32V and the W-phase coil 32W have the same structure as that of the U-phase coil 32U described above. Only one or two of the phase coils 32U, 32V, and 32W may be designed to have the above structure.

The phase coils 32U, 32V, and 32W each of which includes two parallel coil arrays (i.e., the first and second series-connected coil groups G1 and G2) are preferably designed to have ends which are arranged close to the phase terminals T1, T2, or T3 or the neutral point N and dispersedly and equally located over the circumference of the stator core 31. It is also advisable that the phase coils 32U, 32V, and 32W be arranged to meets a relation of [480°/(the number of pole pairs×the number of arrays of the unit coils connected in parallel to each other)]. This reduces a potential difference between a respective adjacent two of the phase coils 32U, 32V, and 32W.

The rotating electrical machine 10 in this embodiment is designed to have the phase coils 32U, 32V, and 32W each of which, as described above, includes two parallel-connected coil arrays: the first series-connected coil group G1 and the second series-connected coil group G2 which are electrically connected parallel to each other. Each of the first and second series-connected coil groups G1 and G2 is wound to occupy an angular range of the stator core 31 which is smaller than the full circumference of the stator core 31. The first and second series-connected coil groups G1 and G2 are offset from each other in the circumferential direction of the stator core 31, thereby facilitating the ease with which the reversing connecting sections are created to reverse the connecting directions of the unit coils.

Modifications of the Second Embodiment

Modifications of the stator core 31 equipped with the phase coils 32U, 32V, and 32W each of which includes the two parallel-connected coil arrays will be described below.

Figure 23A:
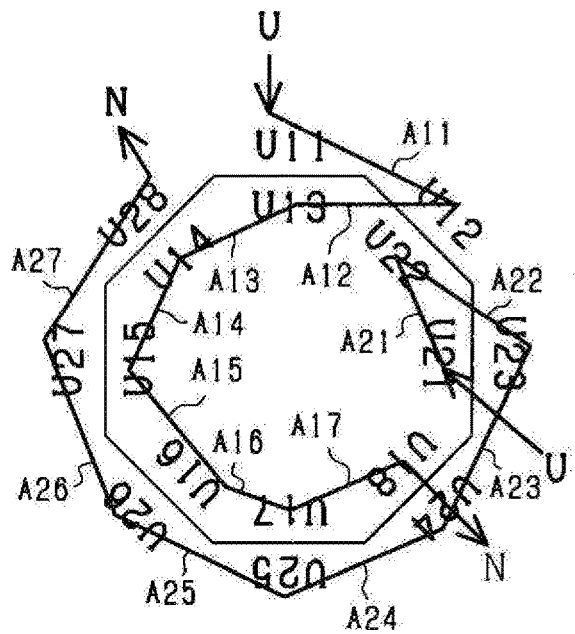
FIGS. 23(a), 23(b), and 23(c) are views which illustrates circumferential locations of unit coils and orientations of connecting conductors connecting the unit coils together in modifications of the second embodiment.
Figure 23B:
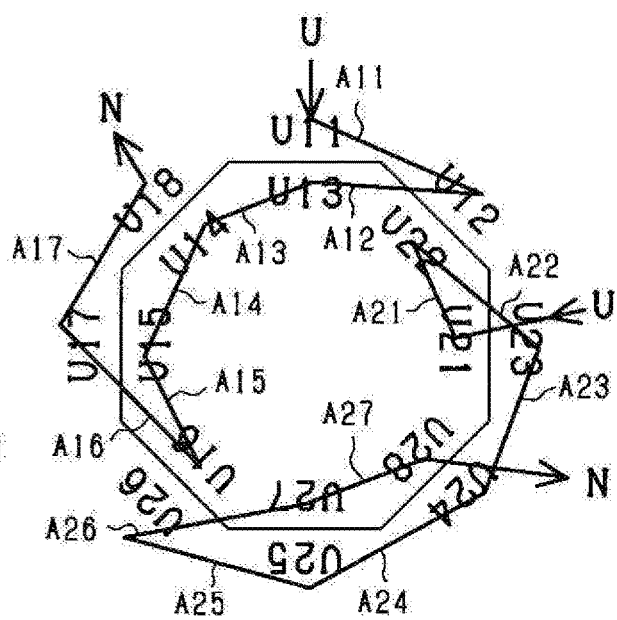
Figure 23C:
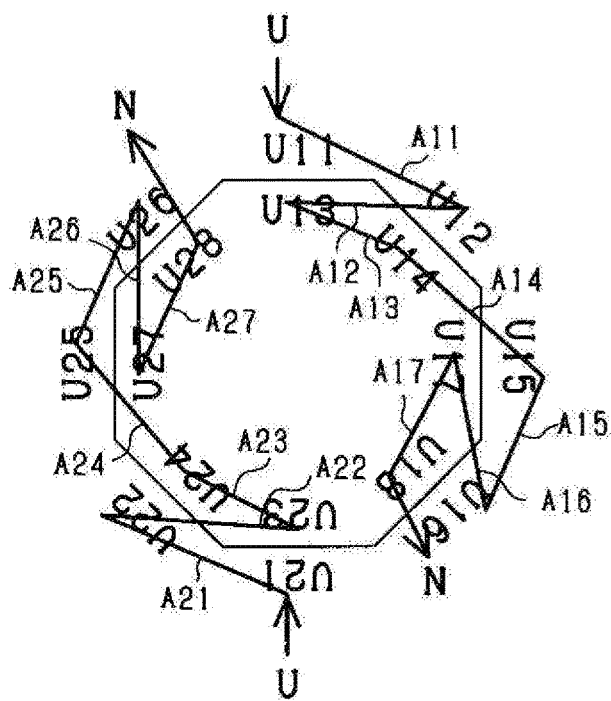

FIGS. 23(a) to 23(c) are views which illustrates circumferential locations of the unit coils U11 to U18 of the first series-connected coil group G1 and the unit coils U21 to U28 of the second series-connected coil group G2 of the U-phase coil 32U and also illustrates the connecting directions of the connecting sections A11 to A27 of the U-phase coil 32U.

In the modification illustrated in FIG. 23(a), in the first series-connected coil group G1, the connecting direction of the connecting section A11 is oriented in the clockwise direction between the U-phase terminal T1 and the neutral point N. The connecting directions of the connecting sections A12 to A17 are oriented in the counterclockwise direction. In the second series-connected coil group G2, the connecting direction of the connecting section A21 is oriented in the counterclockwise direction between the U-phase terminal T1 and the neutral point N. The connecting directions of the connecting sections A22 to A27 are oriented in the clockwise direction. The connecting sections A12 and A22 are used as the reversing connecting sections.

In the modification illustrated in FIG. 23(b), in the first series-connected coil group G1, the connecting direction of the connecting section A11 is oriented in the clockwise direction between the U-phase terminal T1 and the neutral point N. The connecting directions of the connecting sections A12 to A15 are oriented in the counterclockwise direction. The connecting directions of the connecting sections A16 to A17 are oriented in the clockwise direction again. In the second series-connected coil group G2, the connecting direction of the connecting section A21 is oriented in the counterclockwise direction between the U-phase terminal T1 and the neutral point N. The connecting directions of the connecting sections A22 to A25 are oriented in the clockwise direction. The connecting directions of the connecting sections A26 to A27 are oriented in the counterclockwise direction again. The connecting sections A12, A16, A22, and A26 are used as the reversing connecting sections.

In each of the modifications in FIGS. 23(a) and 23(b), the first and second series-connected coil groups G1 and G2 are different in locations of the phase terminal and the neutral point from each other. The circumferential direction in which the unit coils of the first series-connected coil groups G1 extend from the U-phase terminal to the neutral point is opposite to that in which the unit coils of the second series-connected coil group G2 extend from the U-phase terminal to the neutral point.

In the modification illustrated in FIG. 23(c), in the first series-connected coil group G1, the connecting direction of the connecting section A11 is oriented in the clockwise direction between the U-phase terminal T1 and the neutral point N. The connecting direction of the connecting section A12 is oriented in the counterclockwise direction. The connecting directions of the connecting sections A13 to A15 are oriented in the clockwise direction. The connecting direction of the connecting section A16 is oriented in the counterclockwise direction. The connecting direction of the connecting section A17 is oriented in the clockwise direction.

In the second series-connected coil group G2 in FIG. 23(c), the connecting direction of the connecting section A21 is oriented in the clockwise direction between the U-phase terminal T1 and the neutral point N. The connecting direction of the connecting section A22 is oriented in the counterclockwise direction. The connecting directions of the connecting sections A23 to A25 are oriented in the clockwise direction. The connecting direction of the connecting section A26 is oriented in the counterclockwise direction. The connecting direction of the connecting section A27 is oriented in the clockwise direction again. The connecting sections A12, A13, A16, and A17 of the first series-connected coil group G1 and the connecting sections A22, A23, A26, and A27 of the second series-connected coil group G2 are used as the reversing connecting sections.

The first and second series-connected coil groups G1 and G2 in the modification illustrated in FIG. 23(c) are different in locations of the phase terminal and the neutral point from each other. The circumferential orientations of the unit coils of the first and second series-connected coil groups G1 and G2 are substantially identical with each other.

In the modifications in FIGS. 23(a) to 23(c), the first and second series-connected coil groups G1 and G2 are each wound to have the reversing connecting sections in the above way, so that ones of the unit coils U11 to U28 which are located close to the U-phase terminal T1 or the neutral point N are disposed in the same slot 35, thereby minimizing an undesirable rise in potential difference between the unit coils U11 to U28.

In the modifications in FIGS. 23(a) to 23(c), each of the first and second series-connected coil groups G1 and G2 is, like in FIGS. 21 and 22, wound to occupy an angular range of the stator core 31 which is smaller than the full circumference of the stator core 31. The first and second series-connected coil groups G1 and G2 are offset from each other in the circumferential direction of the stator core 31 to have the U-phase coil 32U itself occupy the whole of the circumference of the stator core 31.

Although not illustrated, the V-phase coil 32V and the W-phase coil 32W have the same structure as that of the U-phase coil 32U described above. Only one or two of the phase coils 32U, 32V, and 32W may be designed to have the above structure.

Third Embodiment

Figure 24:
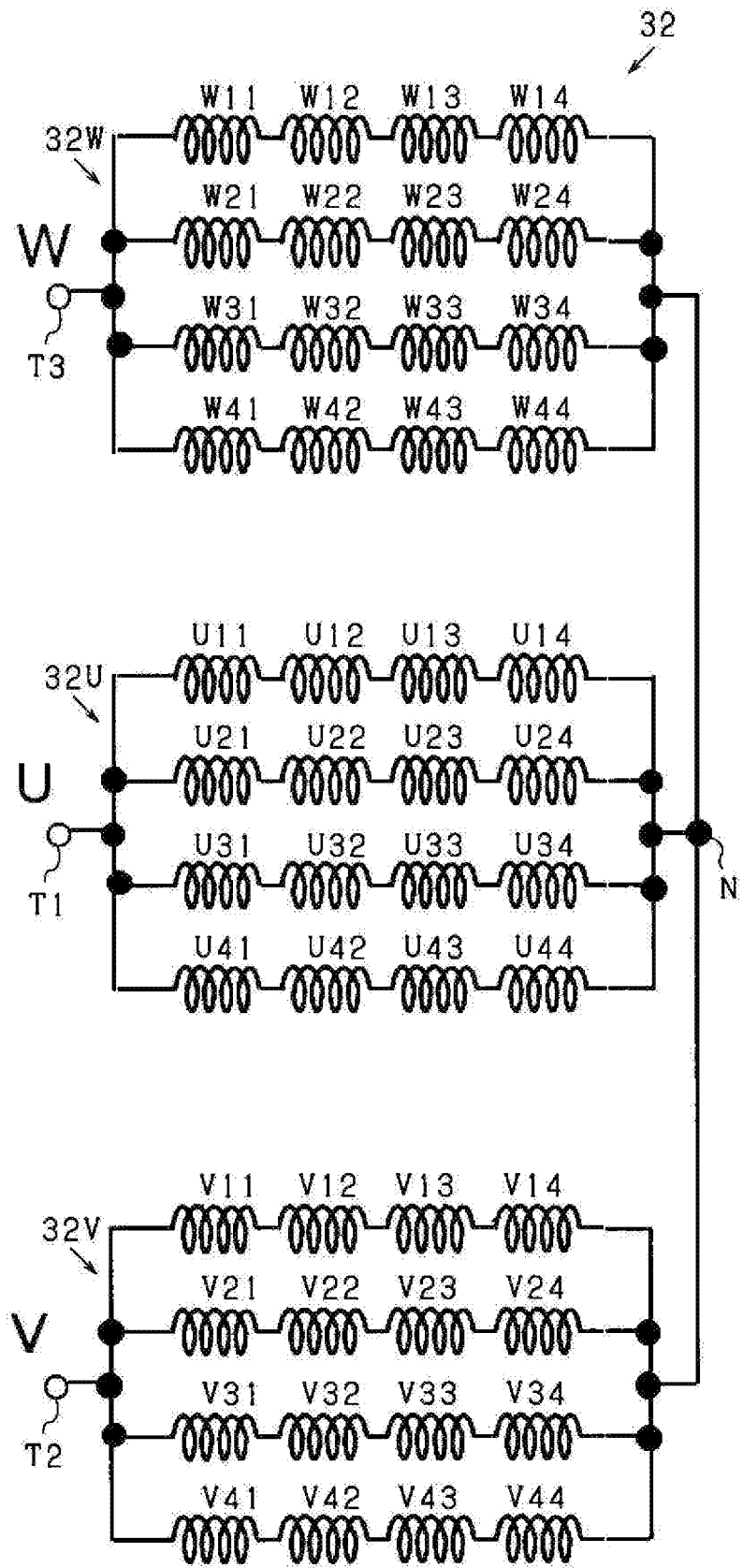
FIG. 24 is a developed view which illustrates a stator winding according to the third embodiment.

The stator winding 32 in the third embodiment is, unlike the first embodiment, designed to have the phase coils 32U, 32V, and 32W each of which is made up of four parallel-connected coil arrays. FIG. 24 illustrates coil connections of the stator winding 32 in this embodiment.

Specifically, the U-phase coil 32U, as can be seen in FIG. 24, includes four series-connected coil groups G1, G2, G3, and G4 which are electrically connected parallel to each other. The series-connected coil group G1 is made up of four unit coils: the unit coils U11, U12, U13, and U14. Similarly, the series-connected coil group G2 is made up of the unit coils U21, U22, U23, and U24. The series-connected coil group G3 is made up of the unit coils U31, U32, U33, and U34. The series-connected coil group G4 is made up of the unit coils U41, U42, U43, and U44. The V-phase coil 32V and the W-phase coil 32W have the same structure as that of the U-phase coil 32U, and explanation thereof in detail will be omitted here.

Figure 25A:
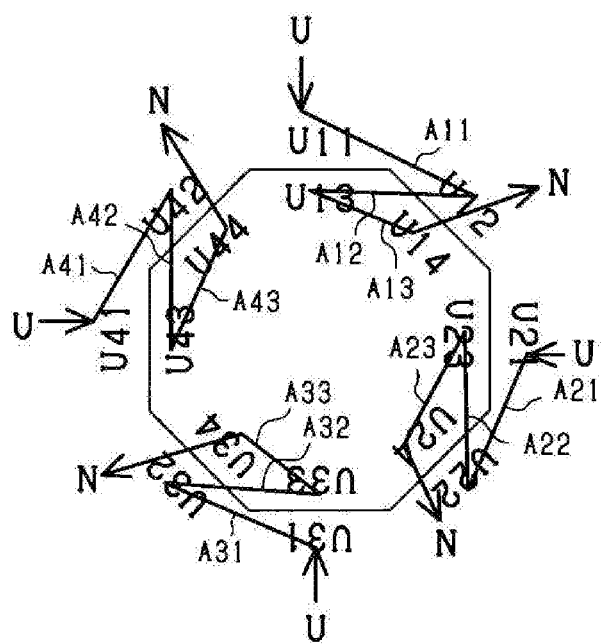
FIGS. 25(a) and 25(b) are views which illustrate circumferential locations of unit coils and orientations of connecting conductors connecting the unit coils together in the third embodiment.
Figure 25B:
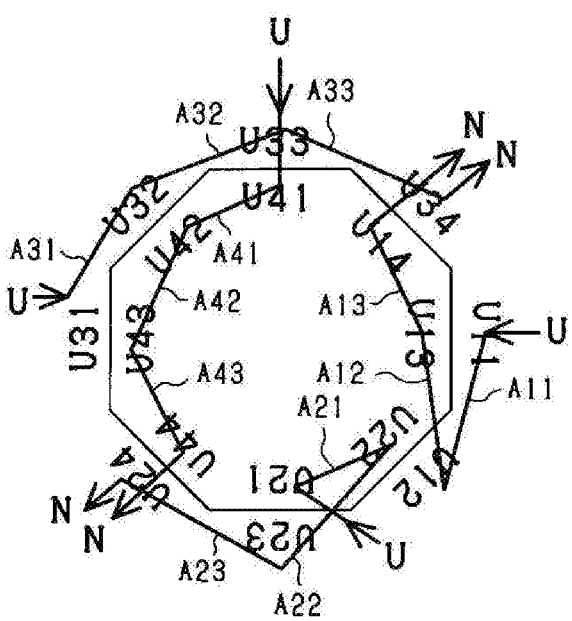

FIGS. 25(a) and 25(b) are views which illustrate circumferential locations of the unit coils U11 to U44 of the series-connected coil groups G1 to G4 of the U-phase coil 32U and also illustrates the connecting directions of the connecting sections A11 to A43 of the U-phase coil 32U.

FIG. 25(a) illustrates the first type of the stator winding 32 in the third embodiment. Specifically, each of the series-connected coil groups G1 to G4 has two reversing connecting sections. Sets of the reversing connecting sections of the series-connected coil groups G1 to G4 are arranged at an equal interval away from each other in the circumferential direction of the stator core 31. More specifically, in the series-connected coil group G1, the connecting directions of the connecting sections A11 and A13 are oriented in the clockwise direction. The connecting direction of the connecting section A12 is oriented in the counterclockwise direction. The connecting sections A12 and A13 are used as the reversing connecting sections. The series-connected coil groups G2, G3, and G4 have the same structure as that of the series-connected coil group G1.

Each of the series-connected coil groups G1 to G4 has the two reversing connecting sections. This causes ones of the unit coils U11 to U44 which are located close to the U-phase terminal T1 or the neutral point N to be disposed in the same slot 35, thereby minimizing an undesirable rise in potential difference between the unit coils U11 to U44.

FIG. 25(b) illustrates the second type of the stator winding 32 in the third embodiment. Specifically, two of the series-connected coil groups G1 to G4, i.e., the series-connected coil groups G1 and G2 each have two reversing connecting sections. The connecting section A12 of the series-connected coil group G1 and the connecting section A32 of the series-connected coil group G2 are used as the reversing connecting sections. The other series-connected coil groups G3 and G4 have no reversing connecting sections.

As apparent from the above discussion, the U-phase coil 32U includes series-connected coil groups (i.e., the series-connected coil groups G1 and G2) equipped with the reversing connecting sections and series-connected coil groups (i.e., the series-connected coil groups G3 and G4) equipped with no reversing connecting sections, but however, the U-phase coil 32U is designed to have at least two reversing connecting sections, thereby enabling ones of the unit coils U11 to U44 which are located closer to the U-phase terminal T1 or the neutral point N to be disposed in the same slot 35, which reduces a potential difference between the unit coils U11 to U44.

In the stator winding 32 in FIGS. 25(a) and 25(b), each of the series-connected coil groups G1 to G4 is wound to occupy an angular range of the stator core 31 which is smaller than the full circumference of the stator core 31. The series-connected coil groups G1 to G4 are offset from each other in the circumferential direction of the stator core 31 to have the U-phase coil 32U itself occupy the whole of the circumference of the stator core 31. Although not illustrated, the V-phase coil 32V and the W-phase coil 32W have the same structure as that of the U-phase coil 32U described above. Only one or two of the phase coils 32U, 32V, and 32W may be designed to have the above structure.

Fourth Embodiment

The rotating electrical machine 10 in each of the above embodiments is configured so that the number of magnetic poles is eight, the number of pole pairs is four, and the number of slots is forty-eight, but however, may alternatively be engineered in a different way. The rotating electrical machine 10 in the fourth embodiment is designed so that the number of magnetic poles is twelve, the number of pole pairs is six, and the number of slots is seventy-two. The rotating electrical machine 10 in this embodiment has substantially the same structure as in the first embodiment except for the number of magnetic poles and the number of the slots 35. The stator winding 32 is, like in the above embodiments, made of conductor segments.

Figure 26B:
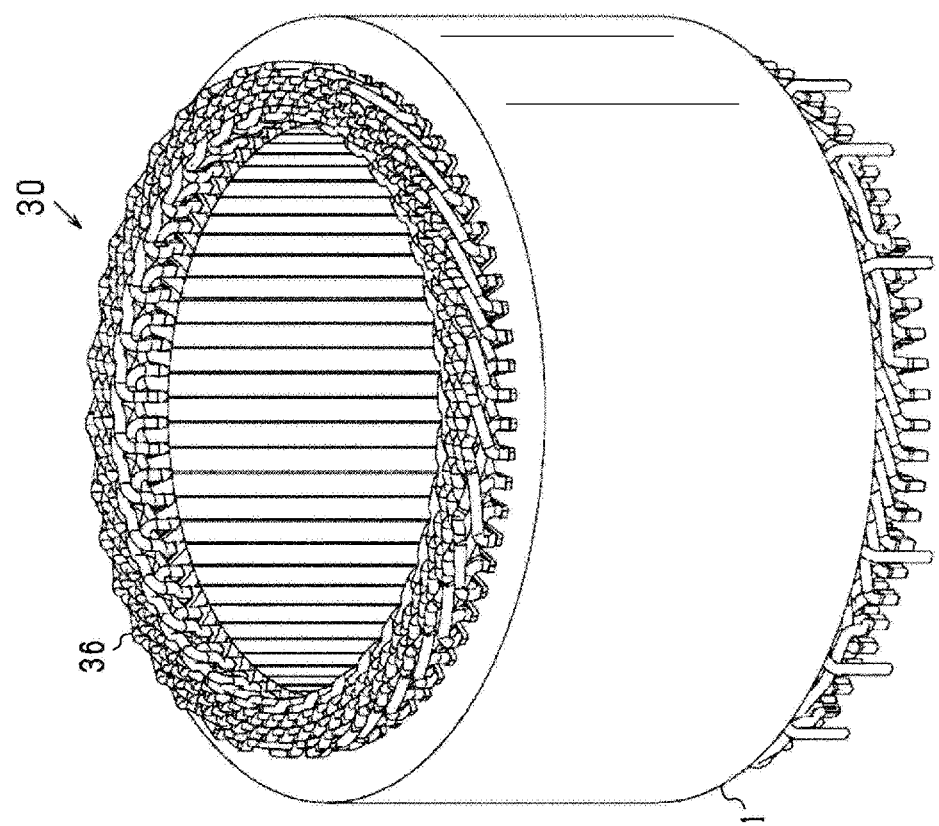
FIGS. 26(a) and 26(b) are perspective views which illustrate a structure of a stator according to the fourth embodiment.
Figure 26A:
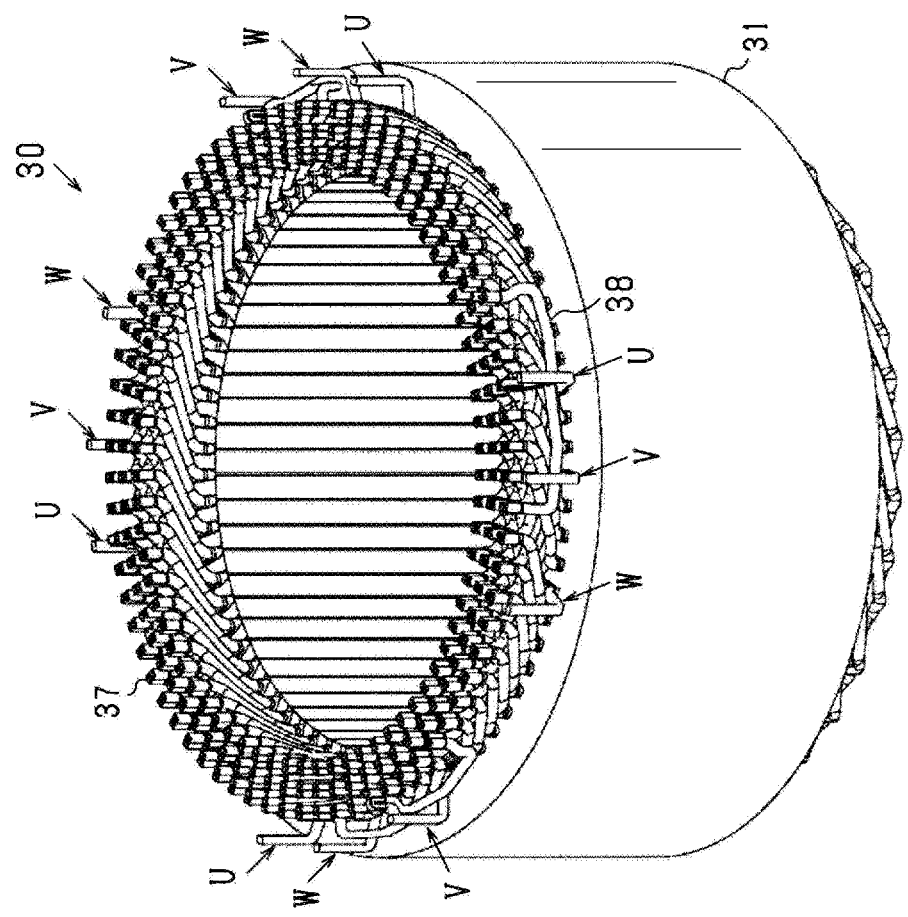

FIGS. 26(a) and 26(b) illustrates the structure of the stator 30 with seventy-two slots formed therein. FIG. 26(a) is a perspective view which shows welds of the conductor segments 50 on a first end (i.e., the coil end 37) of the stator 30. FIG. 26(b) is a perspective view which shows the turns of the conductor segments 50 on a second end (i.e., the coil end 36) of the stator 30 which is opposed to the first end in the axial direction of the stator 30.

The stator 30 has the U-phase coil 32U, the V-phase coil 32V, and the W-phase coil 32W whose ends (which will also be referred to below as winding ends) close to U-phase, V-phase, and W-phase terminals, as denoted by "U", "V", and "W" in the drawing, are disposed on the coil end 37. Each of the phase coils 32U, 32V, and 32W is, as illustrated in FIG. 24, designed to have four parallel-connected coil arrays and, thus, has eight winding ends: four close to a corresponding one of the U-phase, V-phase, and W-phase terminals, and four close to the neutral point. The winding ends of each of the phase coils 32U, 32V, and 32W close to the neutral point N are connected together using the neutral wire 38.

Each of the phase coils 32U, 32V, and 32W includes the four parallel-connected coil arrays (i.e., series-connected coil groups G1, G2, G3, and G4) which are identical in structure with those illustrated in FIG. 24 except for the number of unit coils. Specifically, each of the series-connected coil groups of each of the phase coils 32U, 32V, and 32W includes six coil units electrically connected in series with each other. More specifically, the U-phase coil 32U includes the series-connected coil groups G1, G2, G3, and G4 which are connected in parallel to each other. The series-connected coil group G1 is made up of the six unit coils U11 to U16. Similarly, the series-connected coil group G2 is made up of the six unit coils U21 to U26. The series-connected coil group G3 is made up of the six unit coils U31 to U36. The series-connected coil group G4 is made up of the six unit coils U41 to U46.

Figure 27:
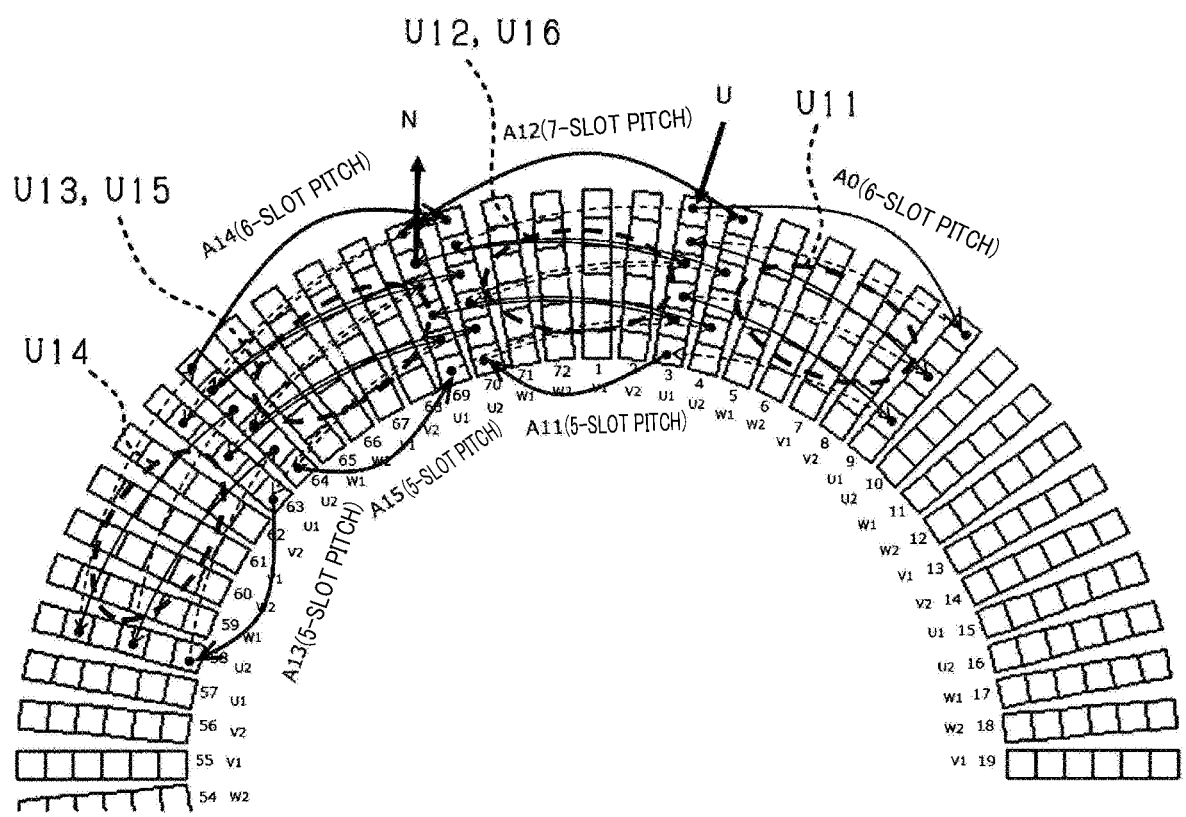
FIG. 27 is a partial view which represents a sequence in which unit coils are joined together in a stator core in the fourth embodiment.

FIG. 27 is a plan view which demonstrate a sequence of steps (i.e., the joining sequence) in which a plurality of unit coils are joined together in the stator core 31. For the sake of convenience, FIG. 27 shows only the series-connected coil G1 (i.e., the unit coils U11 to U16) of the U-phase coil 32U. In FIG. 27, the slots 35 of the stator core 31 are numbered from 1 to 72. The joining sequence is indicated by arrows from the U-phase terminal as a starting point. The arrows on the side of the turns 52 of the conductor segments 50 are expressed by solid lines. The arrows on the side of welds of the conductor segments 50 are expressed by broken lines.

In FIG. 27, the unit coil U11 is disposed in the #3 and #9 slots. The unit coil U12 is disposed in the #70 and #4 slots. The unit coil U13 is disposed in the #63 and #69 slots. The unit coil U14 is disposed in the #58 and #64 slots. The unit coil U15 is disposed in the #64 and #70 slots. The unit coil U16 is disposed in the #69 and #3 slots. The unit coils U11 to U16 extend by a 6-slot pitch in the circumferential direction of the stator core 31. The connecting section A11 connects between the #70 and #3 slots arranged at a 5-slot pitch away from each other. The connecting section A12 connects between #69 and #4 slots arranged at a 7-slot pitch away from each other. The connecting section A13 connects between the #58 and #63 slots arranged at a 5-slot pitch away from each other. The connecting section A14 connects between the #64 and #70 slots arranged at a 6-slot pitch away from each other. The connecting section A15 connects between the #64 and #69 slots arranged at a 5-slot pitch away from each other.

As apparent from the above discussion, the connecting sections A11, A13, and A15 on the radially innermost side of the stator core 31 each extend by a 5-slot pitch. The connecting sections A12 and A14 on the radially outermost side of the stator core 31 extend by a 6- or 7-slot pitch. The above slot pitches of the connecting sections A11 to A15 may alternatively be reversed between the radially outer side and the radially inner side of the stator core 31. In FIG. 27, the conductor segment 50 connecting with the U-phase terminal of the unit coil U11 is expressed by "A0".

Figure 28A:
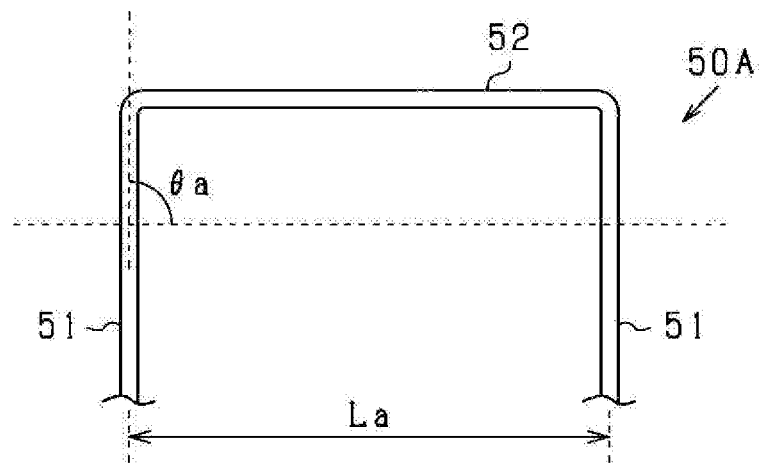
FIGS. 28(a), 28(b), and 28(c) are views which schematically illustrate modifications of a conductor segment.
Figure 28B:
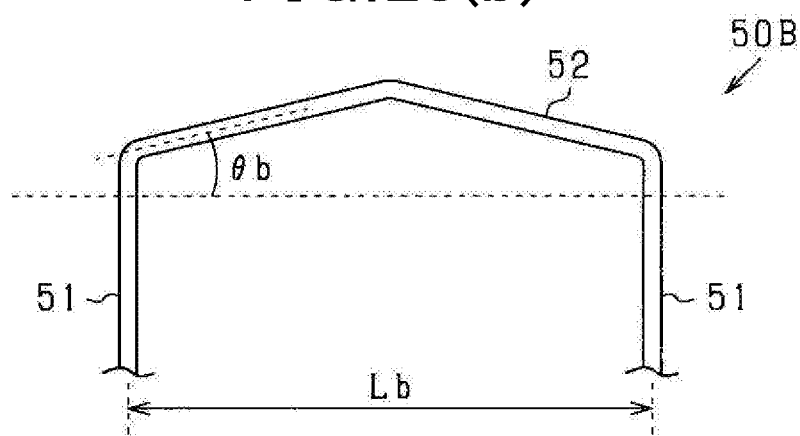
Figure 28C:
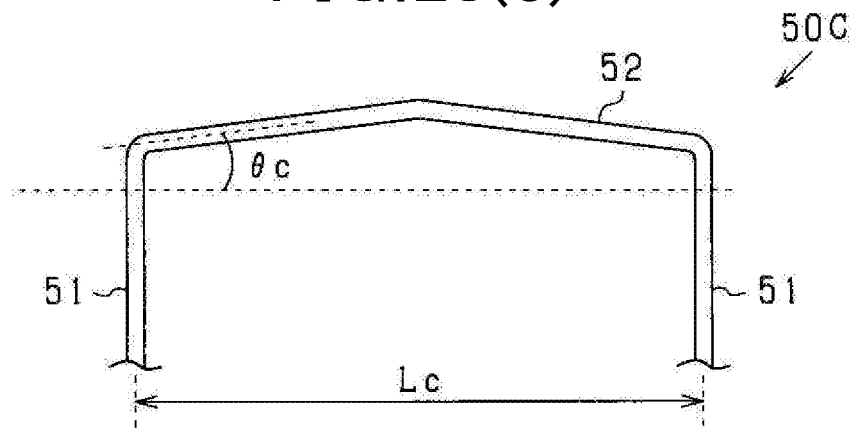

In this embodiment, the connecting sections whose slot pitch are different from each other are provided by differentiating dimensions of the turns 52 of the conductor segments 50 from each other in the circumferential direction of the stator core 31. Specifically, FIGS. 28(a), 28(b), and 28(c) illustrate three types of the conductor segments 50, as denoted by 50A, 50B, and 50C. FIG. 28(a) shows the conductor segment 50A for a 5-slot pitch. FIG. 28(b) shows the conductor segment 50B for a 6-slot pitch. FIG. 28(c) shows the conductor segment 50C for a 7-slot pitch.

The conductor segments 50A to 50C in FIGS. 28(a) to 29(c) have the same overall length. The turns 52 of the conductor segments 50A to 50C have the same overall length, but are different in configuration from each other to have different dimensions La, Lb, and Lc (which will also be referred to below as circumferential dimensions) in the circumferential direction of the stator core 31 (i.e., lateral dimensions, as viewed in FIGS. 28(a) to 28(c), in other words, intervals between coil sides, i.e., the straight sections 51 of the conductor segments 50A to 50C). Specifically, an angle which a portion of the turn 52 which extends away from the straight section 51 makes with a line extending perpendicular to the axial direction of the stator core 31 (i.e., the axial end surface of the stator core 31) is different among the conductor segments 50A, 50B, and 50C. The conductor segments 50A, 50B, and 50C, as illustrated in FIGS. 28(a), 28(b), and 28(c), have angles θa>θb>θc. This results in different circumferential dimensions La, Lb, and Lc (La<Lb<Lc) of the turns 52 of the conductor segments 50A, 50B, and 50C without changing the overall length of the turns 52. Such geometries of the turns 52 enable the coil ends of the conductor segments 50 to be decreased.

The conductor segment 50A in FIG. 28(a) is used as each of the connecting sections A11, A13, and A15 for a 5-slot pitch arranged on the radially innermost side of the stator core 31. The conductor segments 50B and 50C in FIGS. 28(b) and 28(c) are used as the connecting sections A12 and A14 for 6- and 7-slot pitches arranged on the radially outermost side of the stator core 31.

Figure 29A:
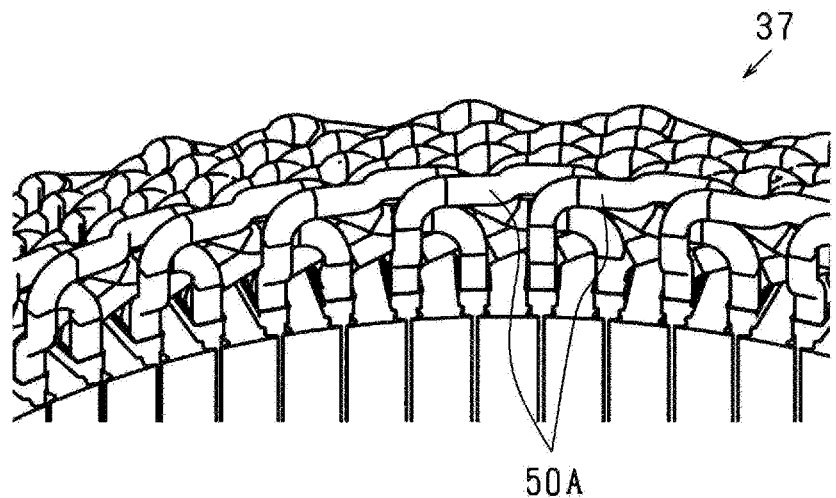
FIGS. 29(a) and 29(b) are enlarged partially perspective views which illustrate a coil end of a stator in the fourth embodiment.
Figure 29B:
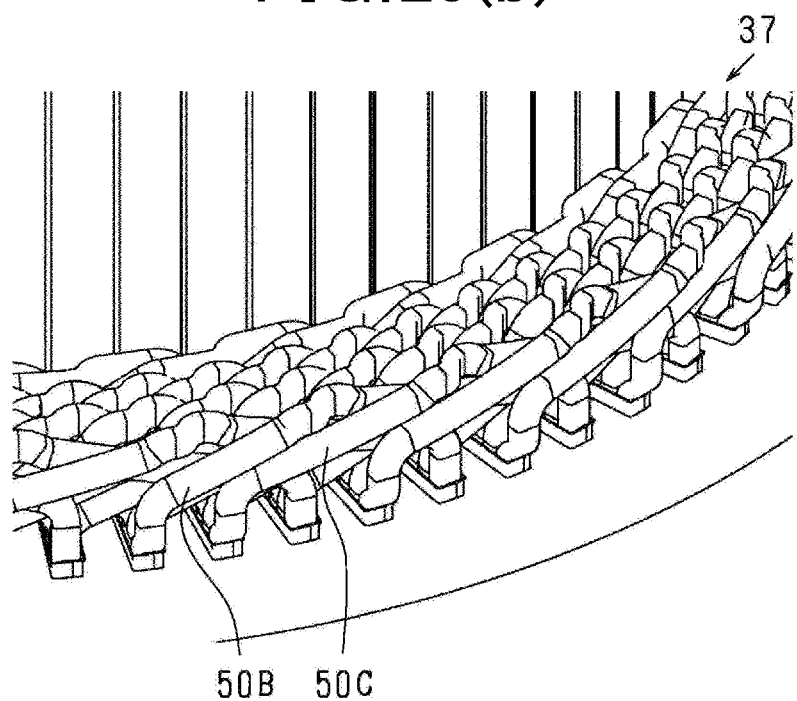

FIGS. 29(a) and 29(b) are enlarged views which illustrate the coil end 37 of the stator winding 32 on the end of the stator core 31 on which the turns 52 are arranged. FIG. 29(a) shows the coil end 37, as viewed from radially inside the stator core 31. FIG. 29(b) shows the coil end 37, as viewed from radially outside the stator core 31. Each of the conductor segments 50, as can be seen in the drawing, has a portion bent in the radial or axial direction of the stator core 31 (which will also be referred to below as an interference avoider) in order to eliminate physical interference between the conductor segments 50.

The conductor segments 50 which are arranged on the end of the stator core 31 on which the turns 52 are disposed include the connecting sections for different slot pitches, while the conductor segments 50 which are arranged on the end of the stator core 31 on which the welds of the conductor segments 50 are disposed and used as the connecting sections are all provided for a 6-slot pitch. This facilitates the ease with each the ends of the conductor segments 50 are welded, which improves the productivity of the stator winding 32.

Referring back to FIG. 27, the U-phase terminal, as denoted by "U", of, for example, the U-phase coil 32U connects with the conductor segment 50 disposed in the #3 slot. The neutral point N connects with the conductor segment 50 disposed in the #69 slot. Arranged next to the #3 slot in the clockwise direction is the unit coil U11. Arranged next to the #3 slot in the counterclockwise direction are the unit coils U12 and U16. Arranged next to the #69 slot in the clockwise direction are the unit coils U12 and U16. Arranged next to the #69 slot in the counterclockwise direction are the unit coils U13 and U15. In other words, each of the series-connected coil groups G1, G2, G3, and G4 of the U-phase coil 32U is made up of the unit coils some of which are disposed on circumferentially opposed sides of each of the U-phase terminal and the neutral point N. This enhances a reduction in potential difference between the coil units of the stator winding 32.

Figure 30:
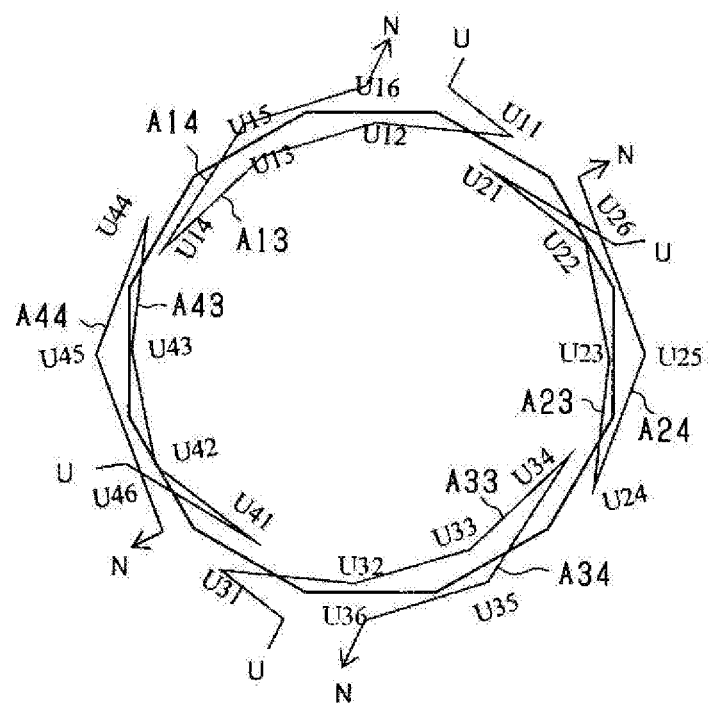
FIG. 30 is a view which illustrates circumferential locations of unit coils and orientations of connecting conductors connecting the unit coils together in the fourth embodiment.

FIG. 30 is a view which illustrates circumferential locations of the unit coils U11 to U16 of the series-connected coil group G1, the unit coils U21 to U26 of the series-connected coil group G2, the unit coils U31 to U36 of the series-connected coil group G3, and the unit coils U41 to U46 of the series-connected coil unit G4 of the U-phase coil 32U and also illustrates the connecting directions of the connecting sections of the U-phase coil 32U. Each of the series-connected coil groups G1 to G4 is equipped with the connecting sections which includes the reversing connecting section used to reverse the connecting direction between adjacent two of the unit coils in terms of the joining sequence.

Specifically, in the series-connected coil group G1, the direction or orientation of the connecting section A14 extending from the unit coil U14 to the unit coil U15 is opposite to that of the connecting section A13 extending from the unit coil U13 to the unit coil U14. The connecting section A14 is, therefore, used as the reversing connecting section. The same is true for the series-connected coil groups G2 to G4. The connecting section A24 of the series-connected coil group G2 is used as the reversing connecting section. The connecting section A34 of the series-connected coil group G3 is used as the reversing connecting section. The connecting section A44 of the series-connected coil group G4 is used as the reversing connecting section. This causes ones of the unit coils of each of the series-connected coil groups G2 to G4 which are close to each other in terms of the joining sequence from the U-phase terminal to be disposed in the same slot, thereby avoiding an undesirable rise in potential difference between the unit coils U11 to U44. The V-phase coil 32V and the W-phase coil 32W have the same structure as that of the U-phase coil 32U, and explanation thereof in detail is omitted here.

Figure 31:
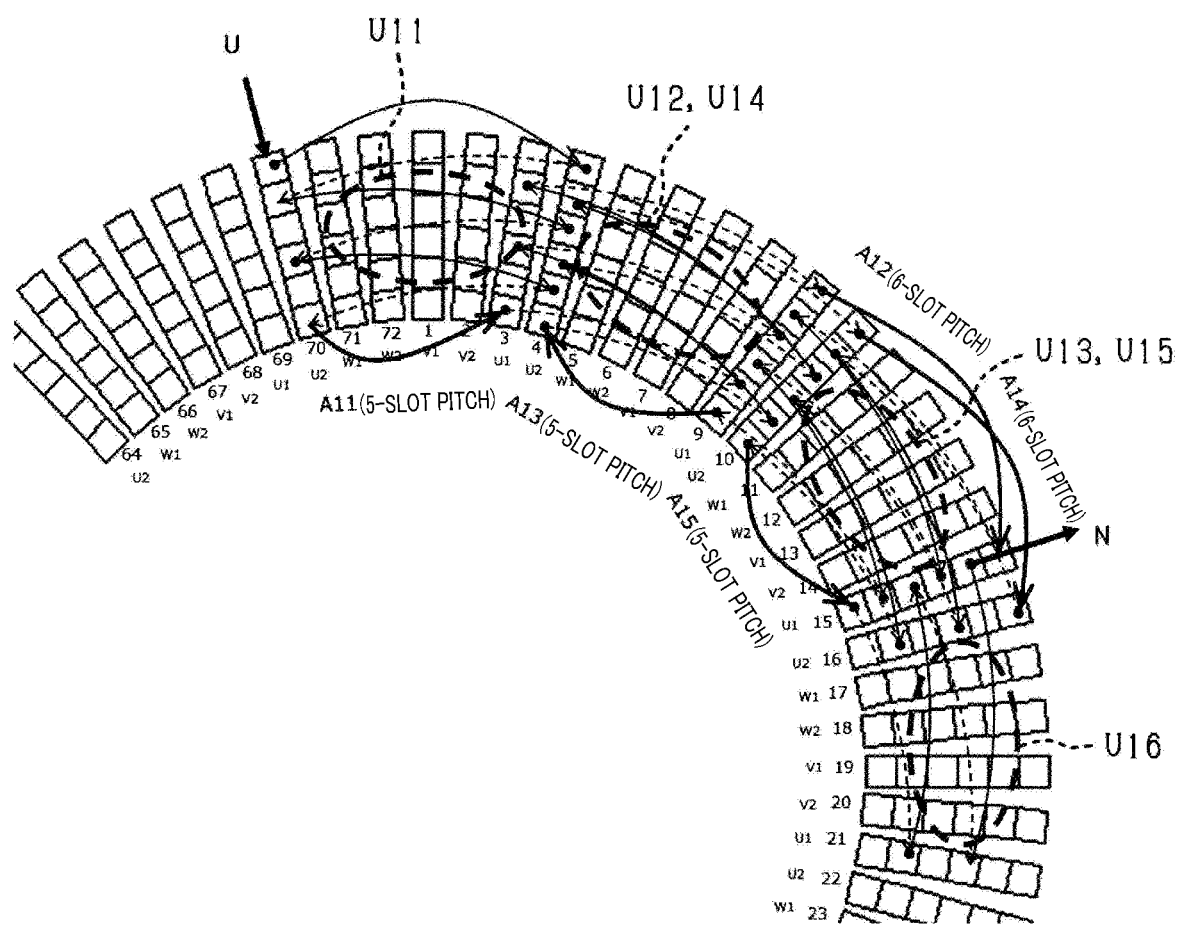
FIG. 31 is a partial view which represents a sequence in which unit coils are joined together in a stator core in a first modification of the fourth embodiment.
Figure 32:
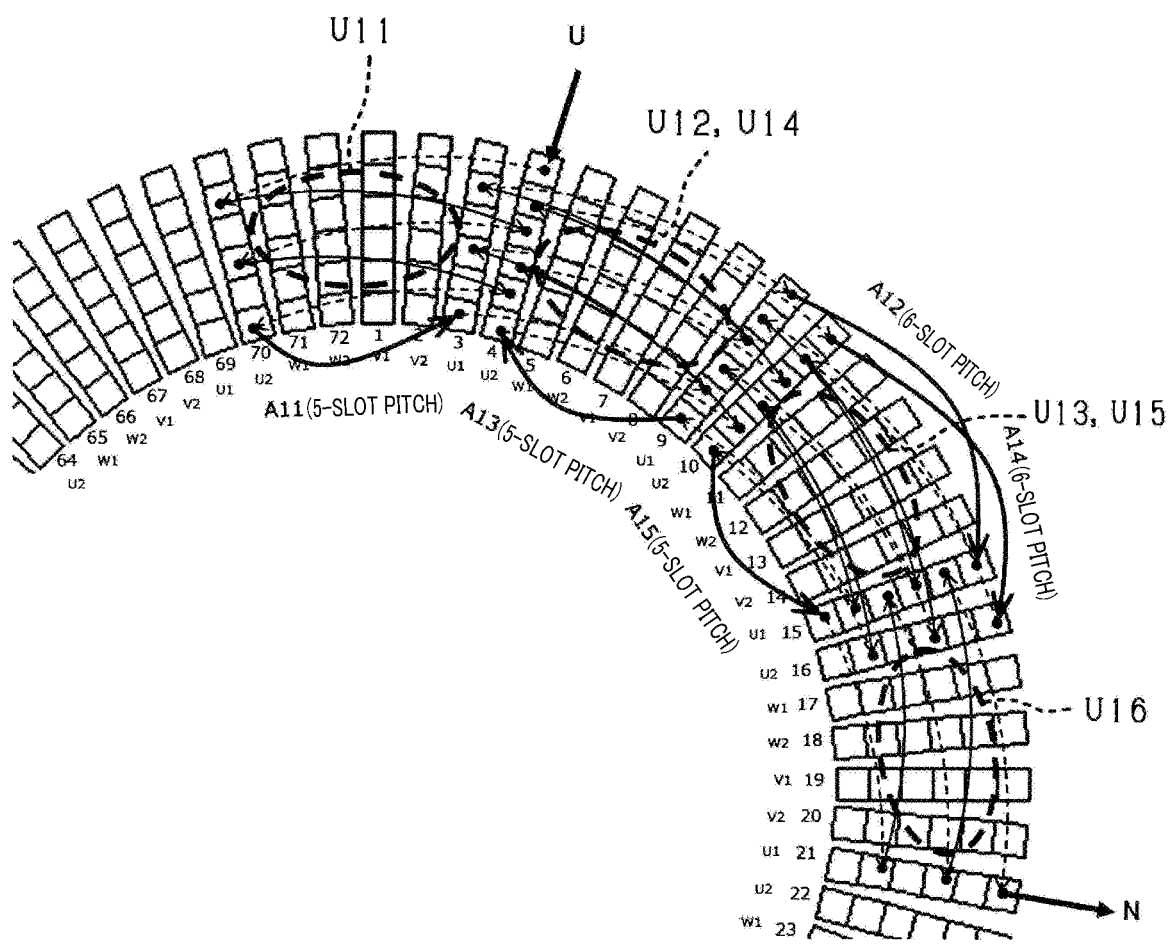
FIG. 32 is a partial view which represents a sequence in which unit coils are joined together in a stator core in a second modification of the fourth embodiment.

FIGS. 31 and 32 illustrate modifications of the stator winding 32 illustrated in FIG. 27.

The following discussion will refer only to differences of the modifications from the stator winding 32 in FIG. 27.

In the modification in FIG. 31, the unit coil U11 is disposed in the #70 and #4 slots. The unit coil U12 is disposed in the #3 and #9 slots. The unit coil U13 is disposed in the #9 and #15 slots. The unit coil U14 is disposed in the #4 and #10 slots. The unit coil U15 is disposed ion the #10 and #16 slots. The unit coil U16 is disposed in the #15 and

21 slots. Each of the unit coils U11 to U16 extend by a 6-slot pitch. The connecting section A11 extends or connects between the #70 and #3 slots arranged at a 5-slot pitch away from each other. The connecting section A12 connects between the #9 and #15 slots arranged at a 6-slot pitch away from each other. The connecting section A13 connects between the #4 and #9 slots arranged at a 5-slot pitch away from each other. The connecting section A14 connects between the #10 and #16 slots arranged at a 6-slot pitch away from each other. The connecting section A15 connects between the #10 and #15 slots arranged at a 5-slot pitch away from each other.

In the modification in FIG. 31, the orientation or direction of the connecting section A13 extending from the unit coil U13 to the unit coil U14 is opposite to that of the connecting section A12 extending from the unit coil U12 to the unit coil U13. The direction of the connecting section A14 extending from the unit coil U14 to the unit coil U15 is opposite to that of the connecting section A13 extending from the unit coil U13 to the unit coil U14. The connecting sections A13 and A14 are, therefore, used as the reversing connecting sections. Although not illustrated in detail, the same applies to the other series-connected coil groups G2 to G4. The above arrangements cause ones of the unit coils of each of the series-connected coil groups G1 to G4 which are close to each other in terms of the joining sequence from the U-phase terminal to be disposed in the same slot, thereby avoiding an undesirable rise in potential difference between the unit coils U11 to U44. The V-phase coil 32V and the W-phase coil 32W have the same structure as that of the U-phase coil 32U, and explanation thereof in detail is omitted here.

The modification shown in FIG. 32 is identical in layout of the unit coils U11 to U16 with that in FIG. 31 except for locations of portions of the stator winding 32 from which the U-phase terminal and the neutral point N extend.

Other Embodiments

The above embodiments may be modified in the following ways.

The stator core 31 may be designed to have two or more slots, e.g., four or more slots for each magnetic pole and each phase.

The rotating electrical machine 10 may alternatively be engineered to be of an outer-rotor type. The rotating electrical machine 10 may alternatively be used for various types of mobile objects or electrical devices for commercial or home use instead of being used as electrical motors which propel vehicles.

What is claimed is:

1. A rotating electrical machine comprising:
a stator which includes a stator core and a stator winding, the stator core having formed therein a plurality of slots arranged adjacent each other in a circumferential direction of the stator core, the stator winding being equipped with a plurality of phase coils wound in the slots; and
a rotor which is disposed to face the stator and has a plurality of magnetic poles arranged adjacent each other in a circumferential direction of the rotor, wherein
the phase coils are connected at first ends thereof to respective phase terminals and at second ends thereof to a neutral point;
each of the phase coils includes a plurality of unit coils which are connected in series with each other in a joining sequence from a corresponding one of the phase terminals and arranged at a given slot pitch away from each other between a corresponding one of the phase terminals and the neutral point, the unit coils being connected together using connecting conductors,
the connecting conductors includes a first connecting conductor which connects the $i^{th}$ unit coil to the $(i+1)^{th}$ unit coil, as counted from a corresponding one of the phase terminals in the joining sequence, and a second connecting conductor which connects the $(i+1)^{th}$ unit coil to the $(i+2)^{th}$ unit coil, as counted from a corresponding one of the phase terminals in the joining sequence, and
each of the phase coils includes two or more reversing connecting conductors each of which is provided by the second connecting conductor and orients a direction in which the second connecting conductor extends from the $(i+1)^{th}$ unit coil to the $(i+2)^{th}$ unit coil to be opposite to that in which the first connecting conductor extends from the $i^{th}$ unit coil to the $(i+1)^{th}$ unit coil in the circumferential direction of the stator core.

2. The rotating electrical machine as set forth in claim 1, wherein each of the phase coils includes a plurality of series-connected coil groups into which the unit coils are broken down, the series-connected coil groups being connected in series with or parallel to each other, and each of the series-connected coil groups is equipped with the reversing connecting conductor.

3. The rotating electrical machine as set forth in claim 2, wherein each of the series-connected coil groups includes four of the unit coils which are connected in series with each other,
the connecting conductors includes a first connecting section, a second connecting section, and a third connecting section, the first connecting section connecting between a first unit coil that is a first one of the unit coils of each of the series-connected coil groups, as counted from a corresponding one of the phase terminals in the joining sequence, and a second unit coil that is a second one of the unit coils, as counted from a corresponding one of the phase terminals in the joining sequence, the second connecting section connecting between the second unit coil and a third unit coil that is a third one of the unit coils, as counted from a corresponding one of the phase terminals in the joining sequence, the third connecting section connecting between the third unit coil and a fourth unit coil that is a fourth one of the unit coils, as counted from a corresponding one of the phase terminals in the joining sequence,
a direction in which the second connecting section extends from the second unit coil to the third unit coil is opposite to that in which the first connecting section extends from the first unit coil to the second unit coil in the circumferential direction of the stator core,
a direction in which the third connecting section extends from the third unit coil to the fourth unit coil is opposite to that in which the second connecting section extends in the circumferential direction of the stator core, and
the second connecting section and the third connecting section are used as the reversing connecting conductors.

4. The rotating electrical machine as set forth in claim 2, wherein each of the phase coils includes the two or more series-connected coil groups connected in parallel to each other and occupies a full circumference of the stator core, each of the series-connected coil groups of each of the phase coils occupies an angular range of the stator core which is smaller than the full circumference of the stator core, and the series-connected coil groups are offset from each other in the circumferential direction of the stator core.

5. The rotating electrical machine as set forth in claim 1, wherein each of the phase coil is made up of the m unit coils which are connected in series with each other between a corresponding one of the phase terminals and the neutral point, and wherein the two or more reversing connecting conductors are arranged in a range of the full circumference of the stator core.

6. The rotating electrical machine as set forth in claim 1, wherein the stator core has formed therein the 2k slots for each pole and each phase where k is a natural number, the unit coils are made of a conductor wound in form of a lap winding, the unit coils having coil sides arranged in the slots in form of multiple layers stacked in a radial direction of the stator core, and if one pole pitch is defined as a j-slot pitch, the connecting conductors extend by at least one of a j-slot pitch, a (j−1) slot pitch, and a (j+1)-slot pitch in the circumferential direction of the stator core.

7. The rotating electrical machine as set forth in claim 6, wherein each of the unit coils is made of a plurality of conductor segments each of which includes a pair of straight sections and a turn connecting the straight sections together, the straight sections of the conductor segments being joined together in form of a lap winding, and each of the connecting conductors connect between excess portions of the straight sections of a respective two of the unit coils which are arranged successively adjacent each other in terms of the joining sequence.

8. The rotating electrical machine as set forth in claim 1, wherein the connecting conductors are arranged alternately on a first radial side and a second radial side of the stator core in terms of the joining sequence of the unit coils, if one pole pitch is defined as a j-slot pitch, the connecting conductors on the first radial side of the stator core extend by the j-slot pitch in the circumferential direction of the stator core, and the connecting conductors on the second radial side of the stator core extend by a (j±1)-slot pitch in the circumferential direction of the stator core.

9. The rotating electrical machine as set forth in claim 1, wherein the connecting conductors are arranged alternately on a first radial side and a second radial side of the stator core in terms of the joining sequence of the unit coils, if one pole pitch is defined as a j-slot pitch, the connecting conductors on the first radial side of the stator core extend by the j− and (j+1) slot pitches in the circumferential direction of the stator core, and the connecting conductors on the second radial side of the stator core extend by a (j−1)-slot pitch in the circumferential direction of the stator core.

10. The rotating electrical machine as set forth in claim 1, wherein the connecting conductors are arranged alternately on a first radial side and a second radial side of the stator core in terms of the joining sequence of the unit coils, if one pole pitch is defined as a j-slot pitch, the connecting conductors on the first radial side of the stator core extend by the j− and (j+1) slot pitches in the circumferential direction of the stator core, and the connecting conductors on the second radial side of the stator core extend by a j− and (j±1)-slot pitch in the circumferential direction of the stator core.

11. The rotating electrical machine as set forth in claim 1, wherein the phase coils are arranged to have a given phase difference between ends leading to the phase terminals, the given phase difference meeting a relation of [480°/(the number of pole pairs×the number of arrays of the unit coils connected in parallel to each other)].

* * * * *